United States Patent
Okuyama et al.

(10) Patent No.: US 11,117,266 B2
(45) Date of Patent: Sep. 14, 2021

(54) CONTROL DEVICE, ROBOT, AND ROBOT SYSTEM

(71) Applicant: Seiko Epson Corporation, Tokyo (JP)

(72) Inventors: Masayuki Okuyama, Suwa (JP); Masayuki Iiyama, Chino (JP)

(73) Assignee: Seiko Epson Corporation

(*) Notice: Subject to any disclaimer, the term of this patent is extended or adjusted under 35 U.S.C. 154(b) by 285 days.

(21) Appl. No.: 16/059,256

(22) Filed: Aug. 9, 2018

(65) Prior Publication Data

US 2019/0047155 A1 Feb. 14, 2019

(30) Foreign Application Priority Data

Aug. 10, 2017 (JP) ............... JP2017-156009
Nov. 24, 2017 (JP) ............... JP2017-226103

(51) Int. Cl.
| | |
|---|---|
| *B25J 9/16* | (2006.01) |
| *B25J 13/08* | (2006.01) |
| *B25J 13/06* | (2006.01) |
| *B25J 13/02* | (2006.01) |

(52) U.S. Cl.
CPC .............. *B25J 13/02* (2013.01); *B25J 9/161* (2013.01); *B25J 9/1633* (2013.01); *B25J 13/06* (2013.01); *B25J 13/082* (2013.01); *B25J 13/085* (2013.01); *G05B 2219/40032* (2013.01)

(58) Field of Classification Search
CPC . B25J 13/02; B25J 9/1633; B25J 9/161; B25J 13/082; B25J 13/06; B25J 13/085; B25J 9/1602; B25J 9/1669; B25J 9/1694; B23P 19/00; G05B 2219/40032
See application file for complete search history.

(56) References Cited

U.S. PATENT DOCUMENTS

| | | | | |
|---|---|---|---|---|
| 3,899,916 A | * | 8/1975 | Cline | G01L 5/225 73/126 |
| 6,236,906 B1 | * | 5/2001 | Muller | B25J 9/1676 700/258 |

(Continued)

FOREIGN PATENT DOCUMENTS

| | | |
|---|---|---|
| JP | 02-145287 A | 6/1990 |
| JP | 2011-230245 A | 11/2011 |

(Continued)

OTHER PUBLICATIONS

JP 2015168017 Translation (Year: 2015).*

*Primary Examiner* — Jeff A Burke
*Assistant Examiner* — Kyle T Johnson
(74) *Attorney, Agent, or Firm* — Harness, Dickey & Pierce, P.L.C.

(57) ABSTRACT

A control device comprising a processor that is configured to execute computer-executable instructions so as to control a robot, wherein the processor is configured to: control a robot with force control on the basis of a force detected by a force detecting device, determine pass/fail of a result of fitting work in which the robot holds an object and fits the object in an object to be fit, control the robot with the force control in the fitting work, and determine the pass/fail on the basis of whether a portion where the force detected by the force detecting device decreases by a first value or more is present in the fitting work.

14 Claims, 18 Drawing Sheets

(56) References Cited

U.S. PATENT DOCUMENTS

| | | | | |
|---|---|---|---|---|
| 8,935,004 B2* | 1/2015 | Iida | ............... | B25J 9/1669 |
| | | | | 700/250 |
| 2008/0288968 A1* | 11/2008 | Shiraishi | ............... | G11B 17/22 |
| | | | | 720/604 |
| 2014/0114477 A1* | 4/2014 | Sato | ............... | B25J 9/1687 |
| | | | | 700/250 |
| 2014/0148819 A1* | 5/2014 | Inoue | ............... | A61B 17/32002 |
| | | | | 606/130 |
| 2014/0160015 A1* | 6/2014 | Ogawa | ............... | B25J 13/02 |
| | | | | 345/156 |
| 2016/0075030 A1* | 3/2016 | Takahashi | ............... | B25J 9/1687 |
| | | | | 700/253 |
| 2017/0008171 A1* | 1/2017 | Iwatake | ............... | B25J 9/1687 |
| 2017/0067728 A1* | 3/2017 | Iwatake | ............... | G01B 21/04 |
| 2017/0183047 A1* | 6/2017 | Takagi | ............... | B62D 57/032 |
| 2018/0021949 A1* | 1/2018 | Miura | ............... | B25J 9/1633 |
| | | | | 700/250 |
| 2018/0043540 A1* | 2/2018 | Satou | ............... | B25J 9/1687 |
| 2018/0093379 A1* | 4/2018 | Shimodaira | ............... | B25J 9/1679 |
| 2018/0200893 A1* | 7/2018 | Taguchi | ............... | B25J 13/085 |
| 2019/0047155 A1* | 2/2019 | Okuyama | ............... | B25J 13/06 |

FOREIGN PATENT DOCUMENTS

| | | | |
|---|---|---|---|
| JP | 2014-188641 A | | 10/2014 |
| JP | 2015168017 A | * | 9/2015 |

* cited by examiner

CONTROL DEVICE, ROBOT, AND ROBOT SYSTEM

BACKGROUND

1. Technical Field

The present invention relates to a control device, a robot, and a robot system.

2. Related Art

There is known a robot including a base and a robot arm including a plurality of arms (links). One arm of two arms adjacent to each other of the robot arm is turnably coupled to the other arm via a joint section. An arm on the most proximal end side (the most upstream side) is turnably coupled to the base via a joint section. The joint sections are driven by motors. The arms turn according to the driving of the joint sections. For example, a hand is detachably attached to an arm on the most distal end side (the most downstream side) as an end effector. For example, the robot grips an object with the hand, moves the object to a predetermined place, and performs predetermined work such as assembly.

JP-A-2014-188641 (Patent Literature 1) discloses a robot that performs insertion work for inserting (fitting) second work into a recessed section of first work. The robot disclosed in Patent Literature 1 detects, in the insertion work, with a force sensor set in a robot arm, a force received by the robot arm, compares a waveform of a graph indicating a change over time of the detected force and a waveform of a reference graph at the time when the insertion work is successful, and determines whether the insertion work is successful.

However, in the robot disclosed in Patent Literature 1, because the waveform of the graph of the force detected in the insertion work and the waveform of the reference graph are compared, it is difficult to program processing of the comparison of the waveforms. Storage of time-series data of the detected force is necessary. Therefore, an amount of data to be stored is enormous.

In the robot disclosed in Patent Literature 1, the robot is controlled by only position control rather than force control to perform the insertion work. Therefore, if the second work deviates from a target position even a little when the second work is brought into contact with the first work, it is highly likely that track correction does not work and the insertion work fails.

SUMMARY

An advantage of some aspects of the invention is to solve at least a part of the problems described above, and the invention can be implemented as the following forms or application examples.

A control device according to an aspect of the invention includes: a force control section configured to control a robot with force control on the basis of a force detected by a force detecting section; and a determining section configured to determine pass/fail of a result of fitting work in which the robot holds an object and fits the object in an object to be fit. In the fitting work, the force control section controls the robot with the force control. In the fitting work, the determining section determines the pass/fail on the basis of whether a portion where the force detected by the force detecting section decreases by a first value or more is present.

With such a control device according to the aspect of the invention, it is possible to easily and accurately determine the pass/fail of the result of the fitting work.

In the control device according to the aspect of the invention, it is preferable that the force control in the fitting work includes first force control in which a target force is a first force and second force control in which a target force is a second force larger than the first force, and the determining section determines the pass/fail on the basis of whether the portion is present while the second force control is performed.

With this configuration, it is possible to reduce a period in which processing for detecting the portion where the force detected by the force detecting section decreases by the first value or more is performed.

In the control device according to the aspect of the invention, it is preferable that, when the result of the fitting work is the "pass", a minimum of the force detected by the force detecting section in the portion is smaller than the first force.

With this configuration, it is possible to more accurately determine the pass/fail of the result of the fitting work.

In the control device according to the aspect of the invention, it is preferable that the determining section determines, in the first force control, whether the fitting work is correctly performed on the basis of a position of a predetermined part of the robot.

With this configuration, it is possible to grasp halfway in the fitting work whether the fitting work is correctly performed. It is possible to take measures according to a result of grasping whether the fitting work is correctly performed.

In the control device according to the aspect of the invention, it is preferable that the first value is equal to or larger than a force of $\frac{1}{5}$ of a difference between the second force and the first force and equal to or smaller than a force of $\frac{1}{3}$ of the difference.

With this configuration, it is possible to prevent a decrease in the force detected by the force detecting section due to the influence of noise from being determined as "pass". It is possible to more accurately determine the pass/fail of the result of the fitting work.

In the control device according to the aspect of the invention, the object includes a first engaging section, the object to be fit includes a second engaging section engageable with the first engaging section in the fitting work, and at least one of the first engaging section and the second engaging section includes an elastic section.

With this configuration, in the fitting work, it is possible to smoothly engage the first engaging section and the second engaging section.

Because the first engaging section and the second engaging section are provided, a portion where a force detected by the force detecting section when the result of the fitting work is the "pass" decreases by the first value or more conspicuously appears. Consequently, it is possible to more accurately determine the pass/fail of the result of the fitting work.

In the control device according to the aspect of the invention, it is preferable that the control device further includes a display control section configured to cause a display section to display information concerning the force detected by the force detecting section in the fitting work.

With this configuration, it is possible to view the information concerning the force displayed on the display section and confirm the result of the fitting work.

In the control device according to the aspect of the invention, it is preferable that the control device further includes a receiving section configured to receive an input of criteria for the determination of the pass/fail, and the determining section determines the pass/fail on the basis of the criteria received by the receiving section.

With this configuration, it is possible to optionally set the criteria according to a change of conditions, for example, at the time when the object and the object to be fit are changed.

In the control device according to the aspect of the invention, it is preferable that the force control section ends the second force control after the determining section determines the pass/fail and before the force detected by the force detecting section reaches the second force.

With this configuration, it is possible to reduce a time required for the fitting work.

In the control device according to the aspect of the invention, it is preferable that the determining section determines that the result of the fitting work is the "pass" when the portion is present.

With this configuration, it is possible to more accurately determine the pass/fail of the result of the fitting work.

In the control device according to the aspect of the invention, it is preferable that, after the fitting work, the force control section controls the robot with the force control and moves the object in an opposite direction of a direction in the fitting, and the determining section determines that the result of the fitting work is the "pass" when the force detecting section detects a force equal to or larger than a second value larger than 0.

With this configuration, it is possible to more accurately determine the pass/fail of the result of the fitting work.

A control device according to another aspect of the invention includes a processor capable of controlling a robot with force control on the basis of a force detected by a force detecting section and determining pass/fail of a result of fitting work in which the robot holds an object and fits the object in an object to be fit. In the fitting work, the processor controls the robot with the force control and determines the pass/fail on the basis of whether a portion where the force detected by the force detecting section decreases by a first value or more is present.

With such a control device according to the aspect of the invention, it is possible to easily and accurately determine the pass/fail of the result of the fitting work.

A robot according to still another aspect of the invention includes a robot arm. The robot is controlled by the control device according to the aspect of the invention.

With such a robot according to the aspect of the invention, it is possible to easily and accurately determine the pass/fail of the result of the fitting work.

A robot system according to still another aspect of the invention includes: a robot including a robot arm; and the control device according to the aspect of the invention configured to control the robot.

With such a robot system according to the aspect of the invention, it is possible to easily and accurately determine the pass/fail of the result of the fitting work.

BRIEF DESCRIPTION OF THE DRAWINGS

The invention will be described with reference to the accompanying drawings, wherein like numbers reference like elements.

DESCRIPTION OF EXEMPLARY EMBODIMENTS

A control device, a robot, and a robot system according to the invention are explained in detail below with reference to embodiments illustrated in the accompanying drawings.

First Embodiment

Figure 1:
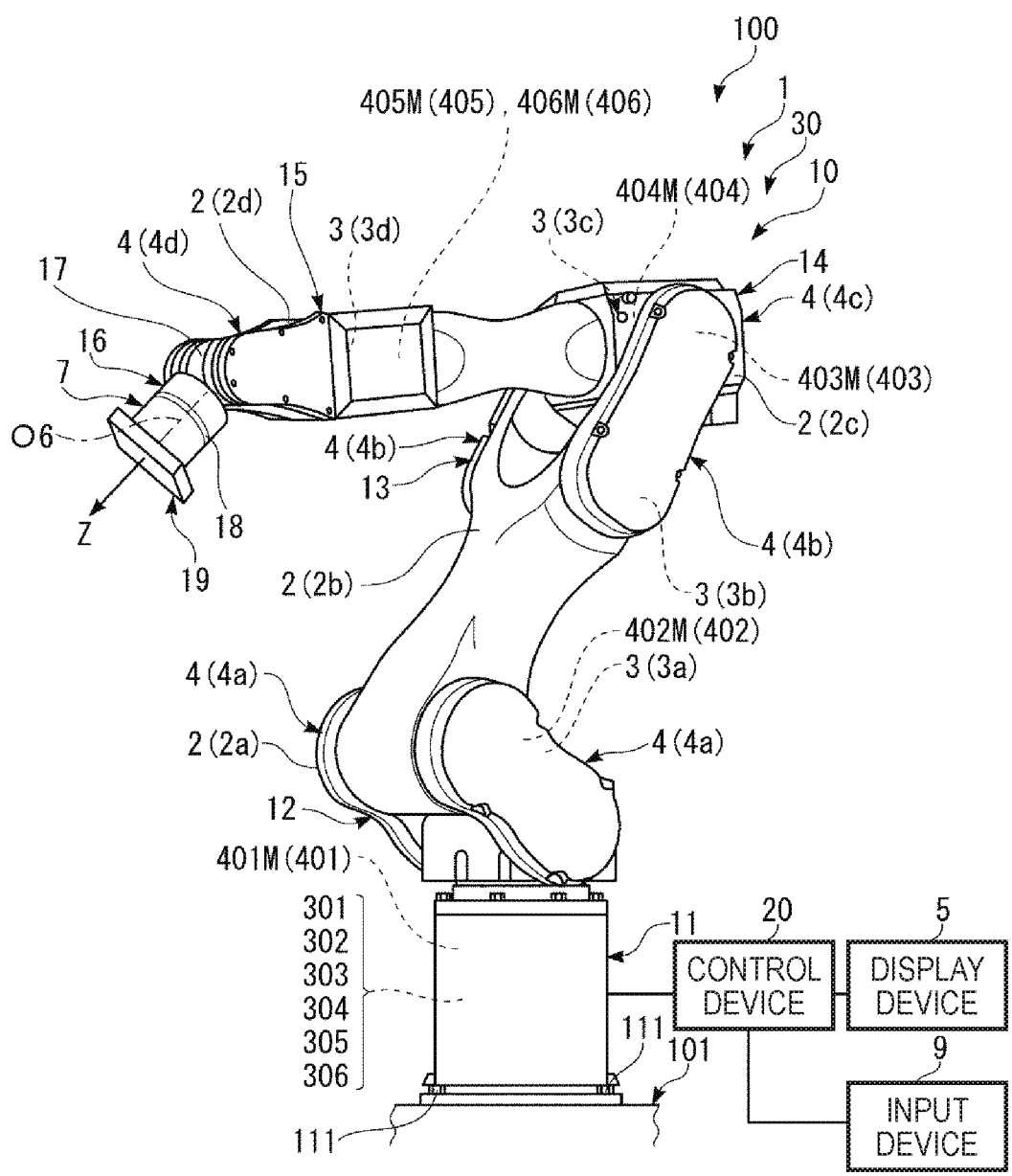
FIG. 1 is a perspective view (including a block diagram) showing a robot of a robot system according to a first embodiment of the invention.
Figure 2:
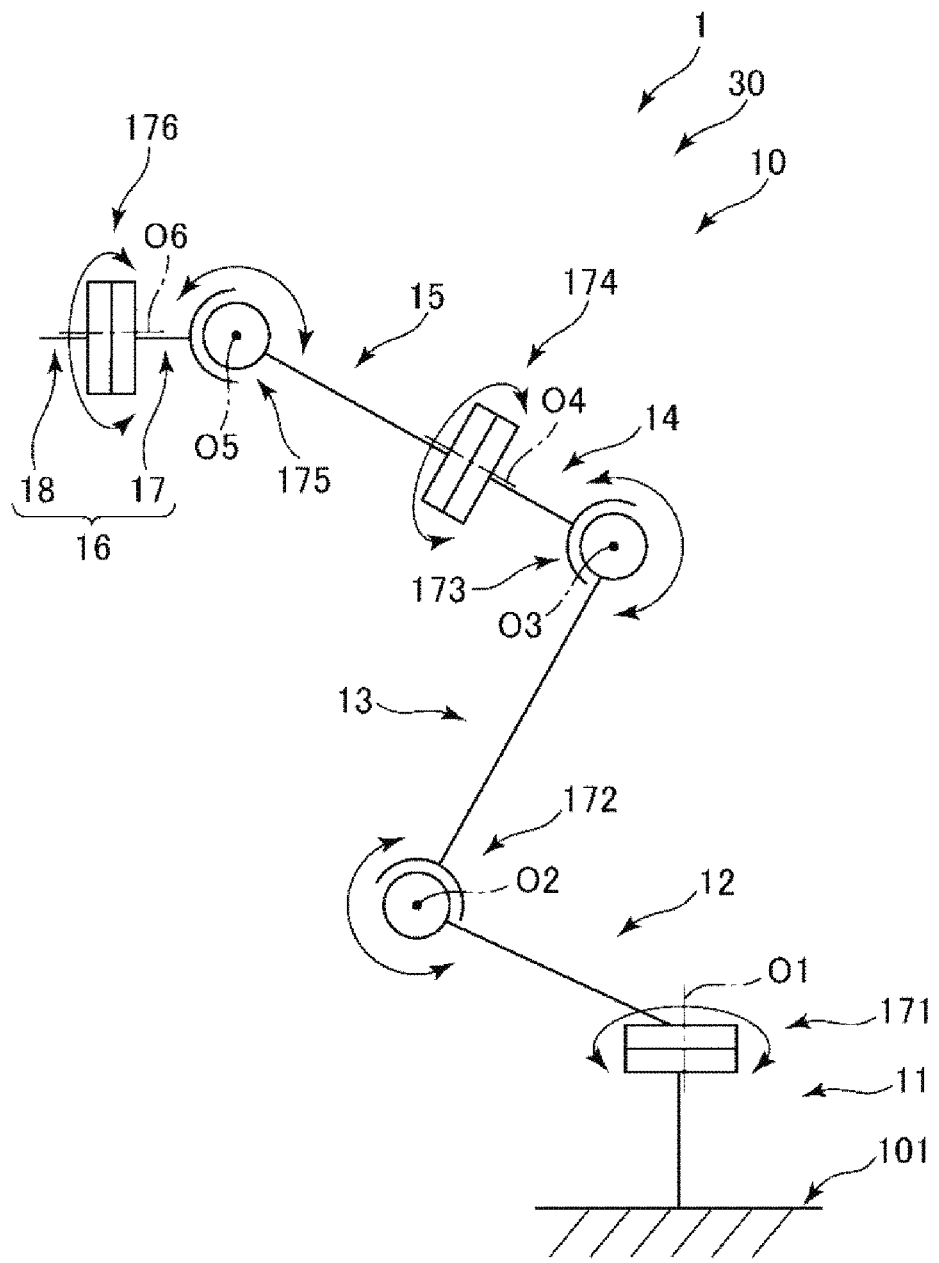
FIG. 2 is a schematic diagram of the robot shown in FIG. 1.
Figure 3:
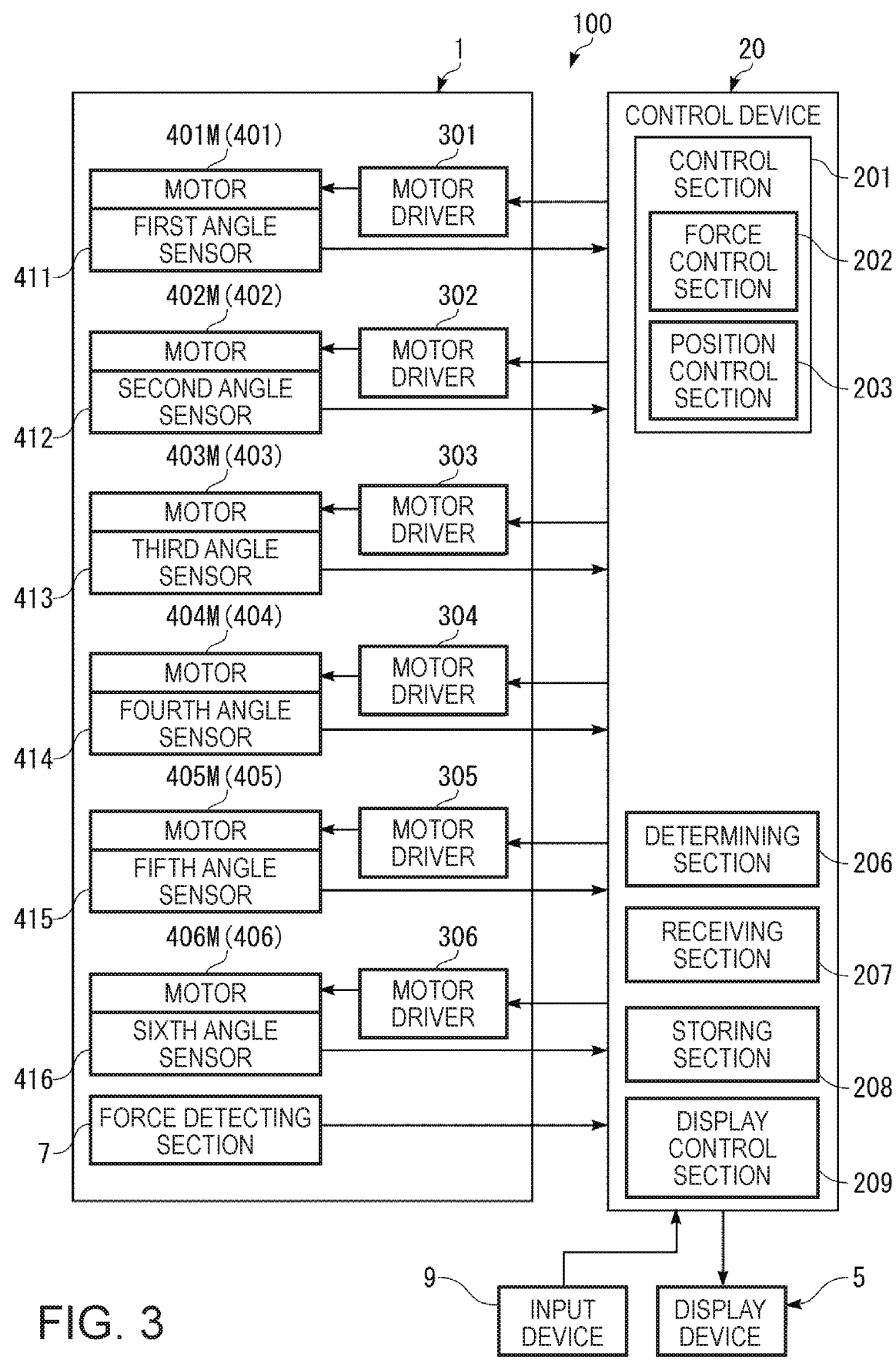
FIG. 3 is a block diagram showing a main part of the robot system according to the first embodiment.
Figure 4:
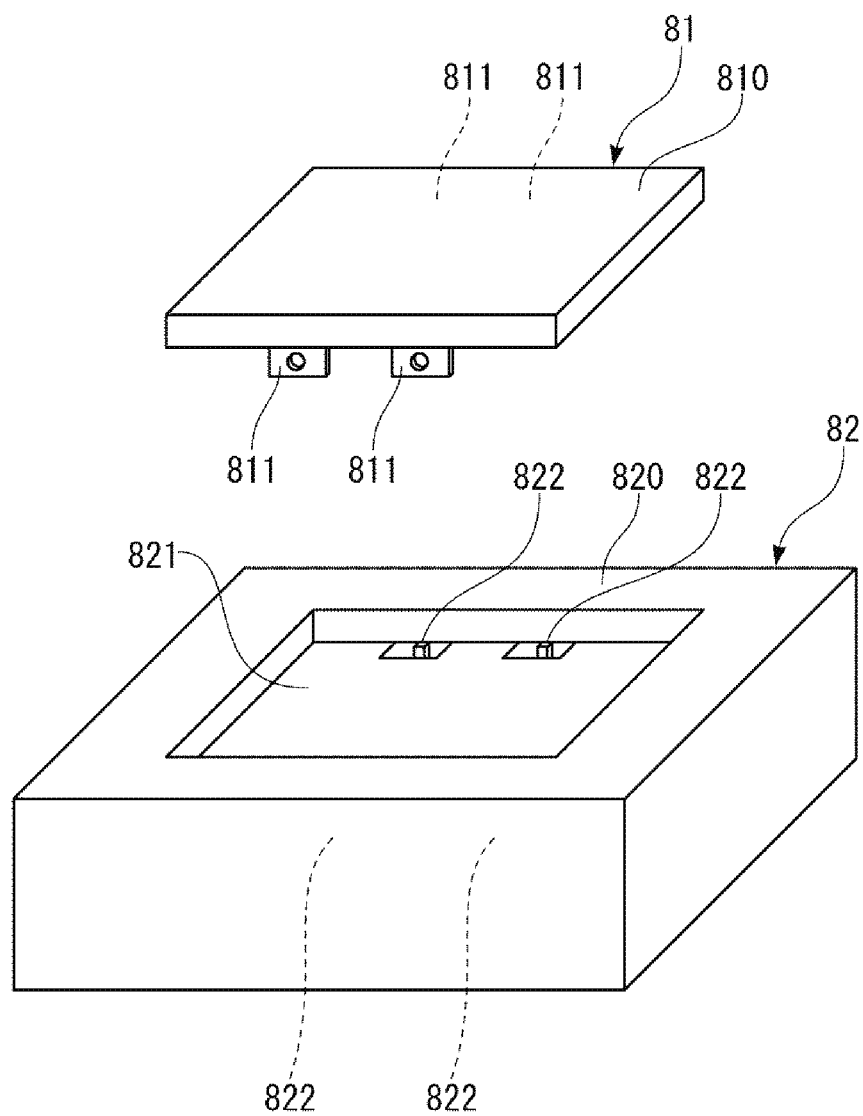
FIG. 4 is a perspective view showing an object and an object to be fit.
Figure 5:
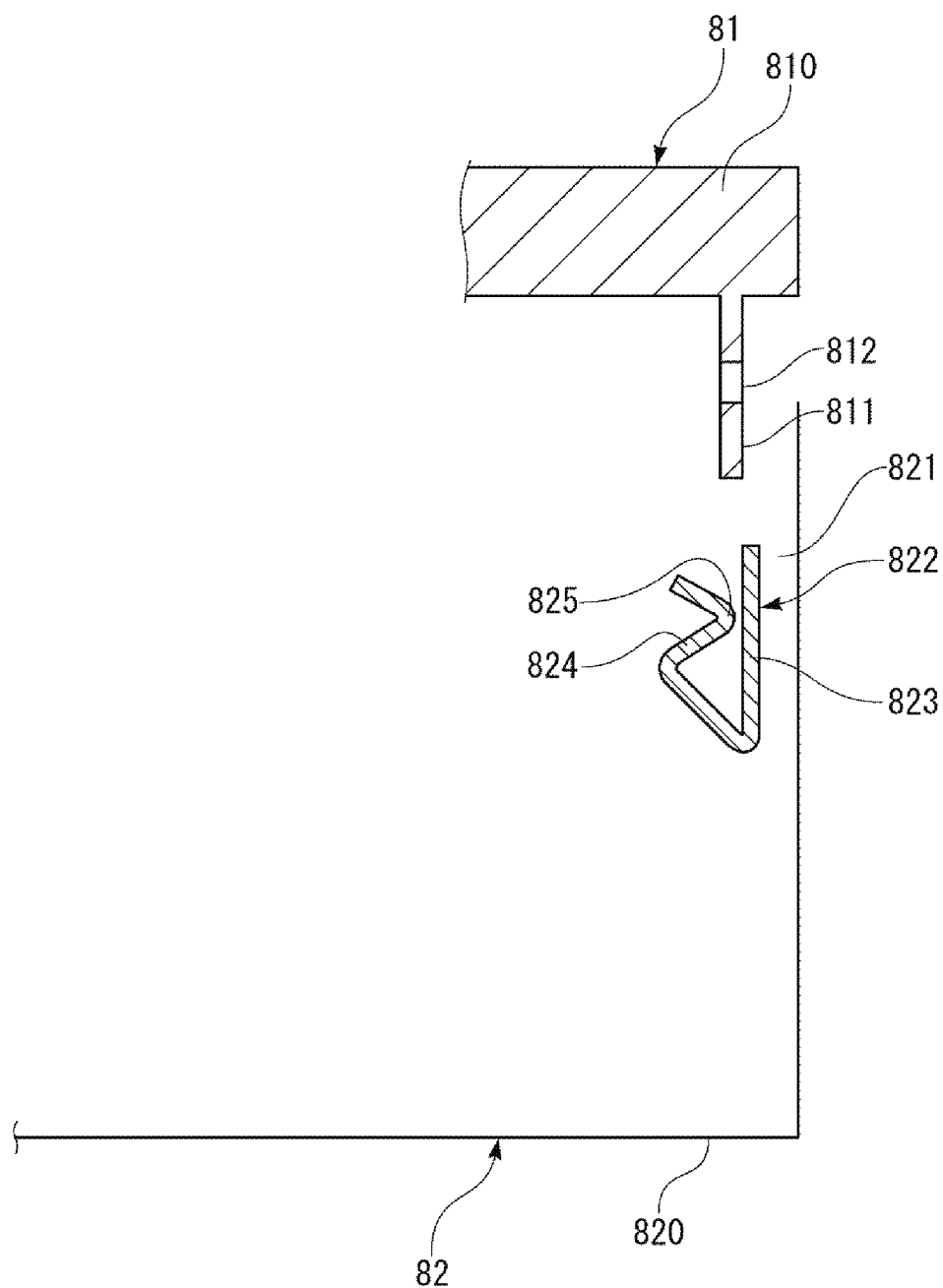
FIG. 5 is a sectional view (including a schematic view) showing a first engaging section of the object and a second engaging section of the object to be fit.
Figure 6:
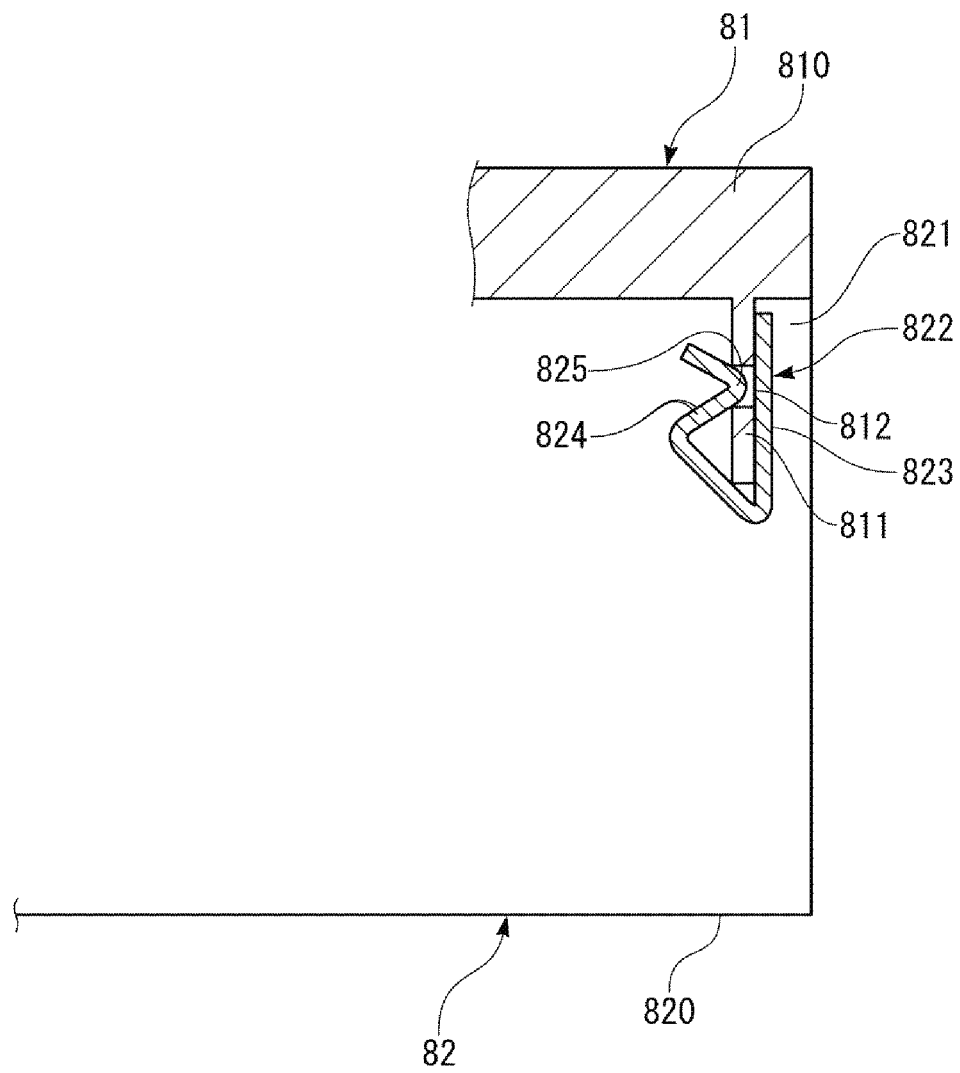
FIG. 6 is a sectional view (including a schematic view) showing the first engaging section of the object and the second engaging section of the object to be fit.
Figure 7:
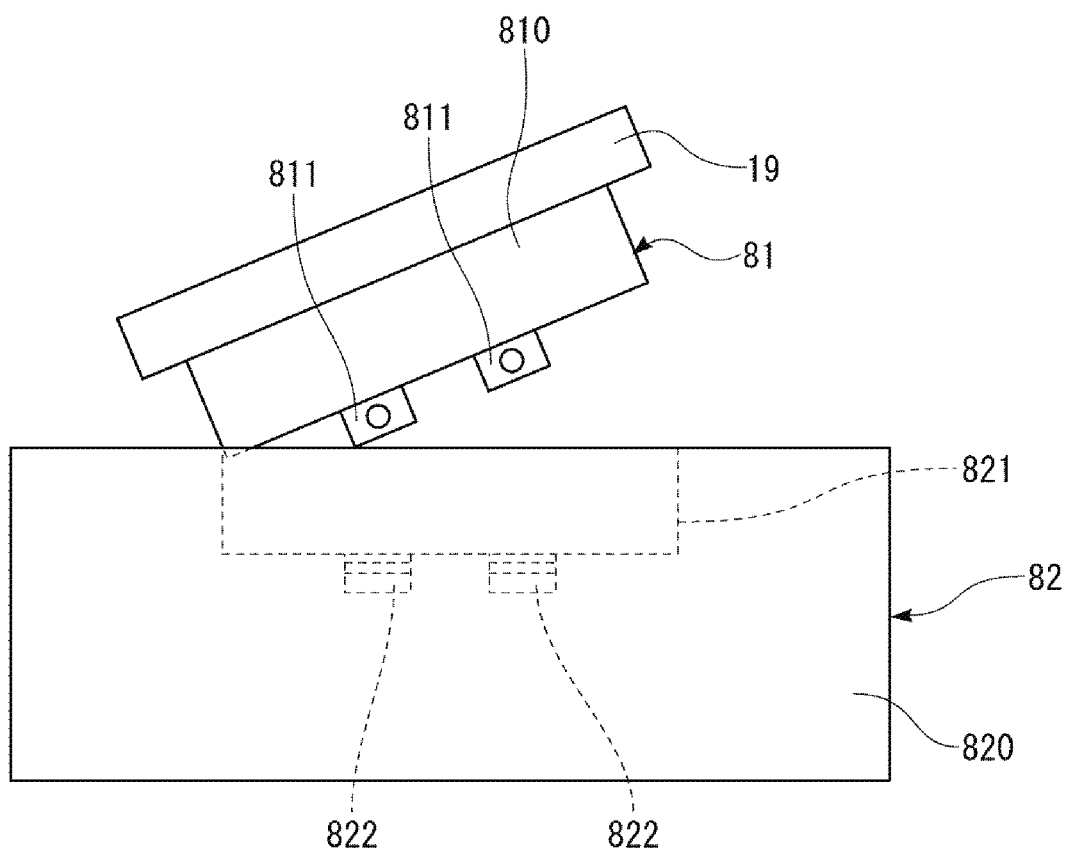
FIG. 7 is a diagram for explaining fitting work.
Figure 8:
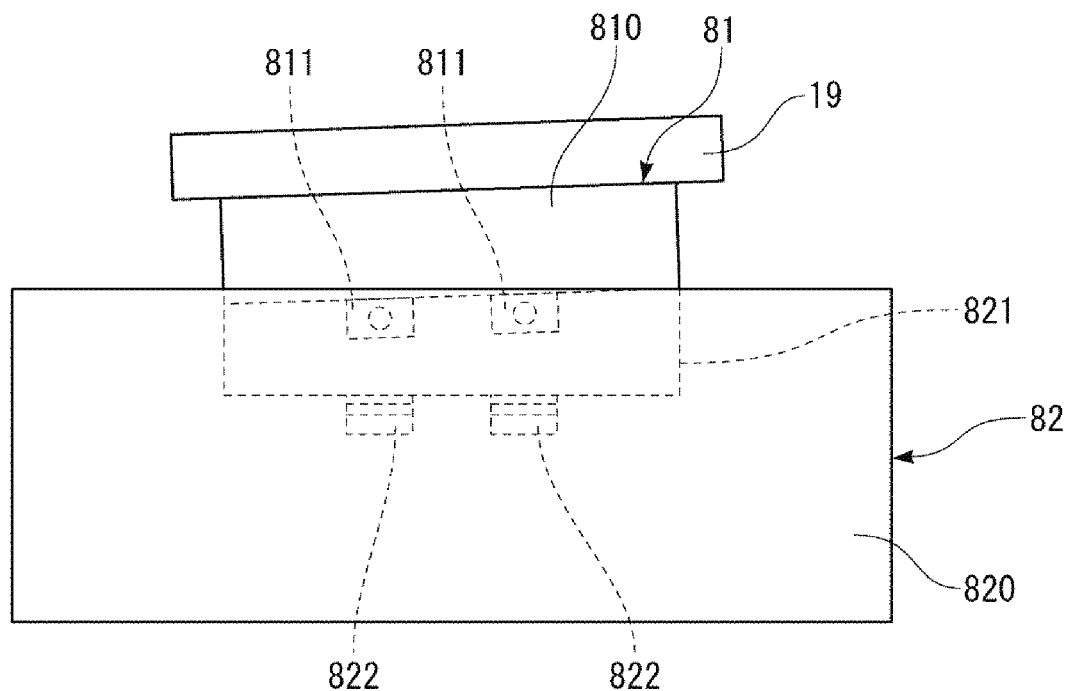
FIG. 8 is a diagram for explaining the fitting work.
Figure 9:
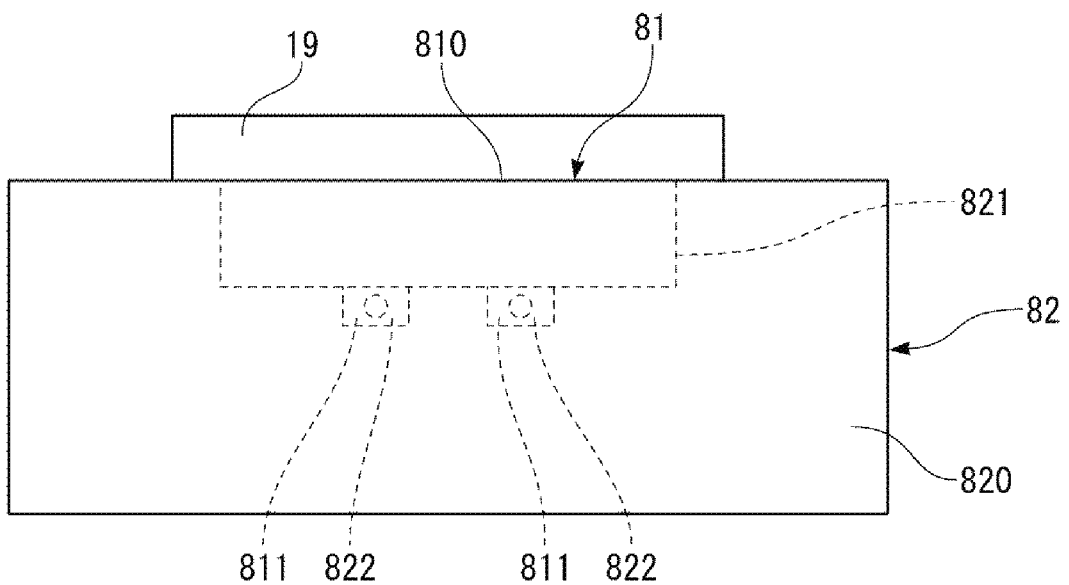
FIG. 9 is a diagram for explaining the fitting work.
Figure 10:
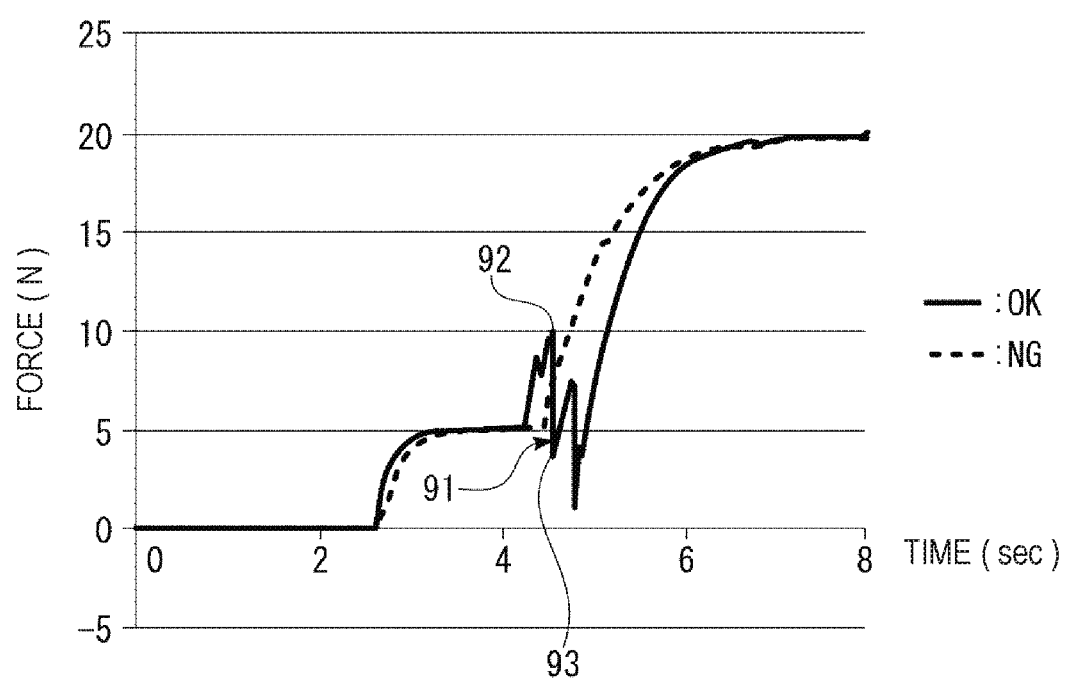
FIG. 10 is a graph showing a change over time of a force detected by a force detecting section in the fitting work.
Figure 11:
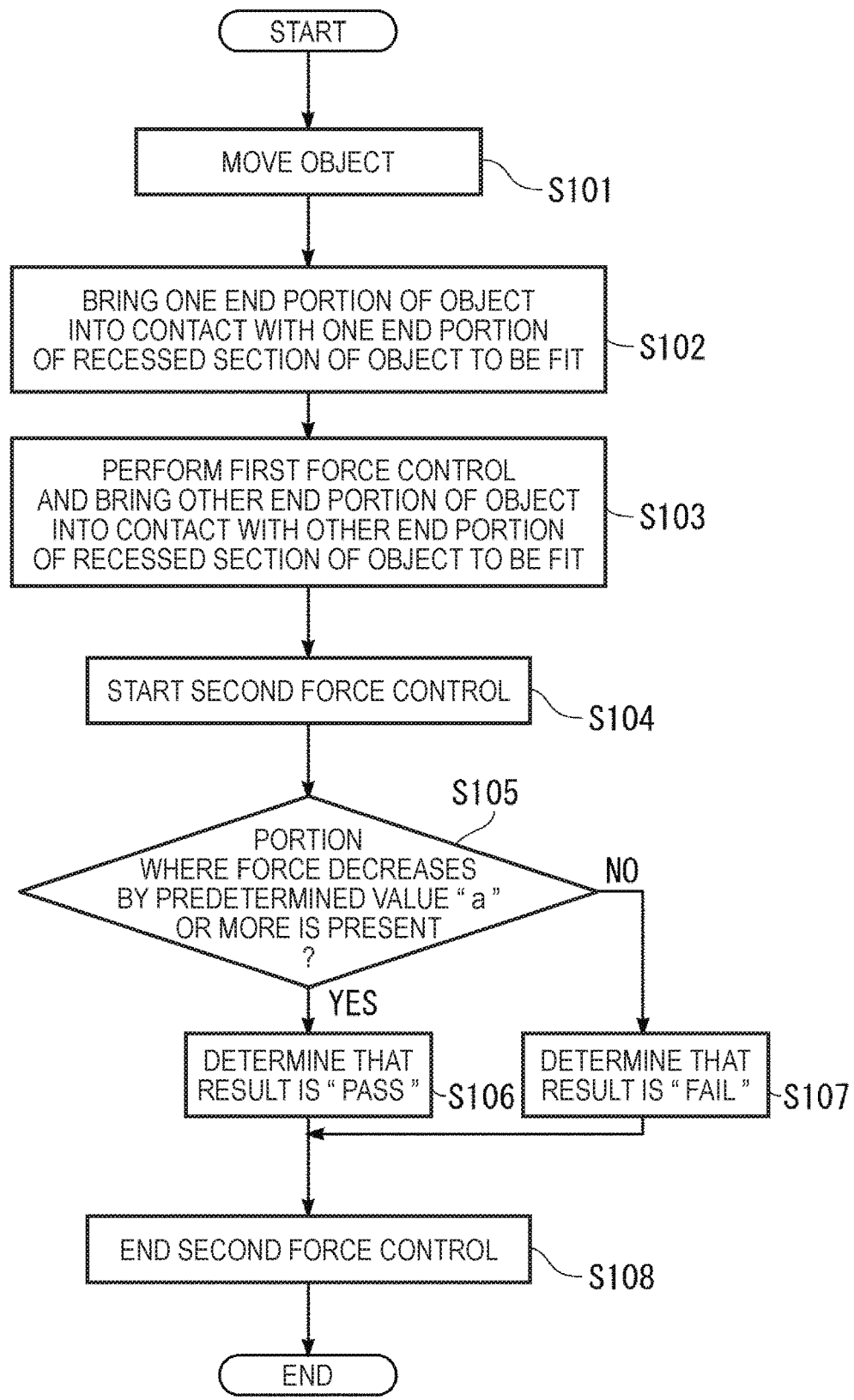
FIG. 11 is a flowchart for explaining control operation of a control device of the robot system according to the first embodiment.

FIG. 1 is a perspective view (including a block diagram) showing a robot of a robot system according to a first embodiment of the invention. FIG. 2 is a schematic diagram of the robot shown in FIG. 1. FIG. 3 is a block diagram showing a main part of the robot system according to the first embodiment. FIG. 4 is a perspective view showing an object and an object to be fit. FIGS. 5 and 6 are respectively sectional views (including schematic views) showing a first engaging section of the object and a second engaging section of the object to be fit. FIGS. 7, 8, and 9 are respectively diagrams for explaining fitting work. FIG. 10 is a graph showing a change over time of a force detected by a force detecting section in the fitting work. FIG. 11 is a flowchart for explaining control operation of a control device of the robot system according to the first embodiment.

Note that, in FIG. 1 and FIGS. 7 to 9, an end effector is schematically shown. In FIG. 2, illustration of the end effector and the force detecting section is omitted. In FIGS. 7 to 9, concerning the robot, only the end effector is illustrated.

In the following explanation, for convenience of explanation, an upper side in FIG. 1, FIG. 2, and FIGS. 4 to 9 is referred to as "upper" or "upward" and a lower side in FIG. 1, FIG. 2, and FIGS. 4 to 9 is referred to as "lower" or "downward". A base side in FIGS. 1 and 2 is referred to as "proximal end" or "upstream" and the opposite side of the base side is referred to as "distal end" or "downstream". An up-down direction in FIG. 1, FIG. 2, and FIGS. 4 to 9 is the vertical direction.

In this specification, "horizontal" includes not only complete horizontality but also inclination within ±5° with respect to the horizontality. Similarly, in this specification, "vertical" includes not only complete verticality but also inclination within ±5° with respect to the verticality. In this specification, "parallel" includes not only mutual complete parallelism of two lines (including axes) or surfaces but also inclination within ±5°. In this specification, "orthogonal" includes not only mutual complete orthogonality of two lines (including axes) or surfaces but also inclination within ±5°.

A robot system 100 shown in FIGS. 1 and 3 includes a robot 1, a control device 20 that controls the robot 1, a display device 5 (a display section), and an input device 9 (an input section). Uses of the robot system 100 are not particularly limited. The robot system 100 can be used in various kinds of work such as holding, conveyance, assembly, and inspection of work (objects) such as electronic components and electronic devices.

The robot 1 and the control device 20 are electrically connected (hereinafter simply referred to as "connected" as well) by a cable. The control device 20, the display device 5, and the input device 9 are electrically connected to one another by a cable.

Note that the robot 1 and the control device 20 are not limited to the wired system. For example, the cable may be omitted. The robot 1 and the control device 20 may perform communication in a wireless system. A part or the entire control device 20 may be incorporated in the robot 1.

The display device 5 and the control device 20 are not limited to the wired system. For example, the cable may be omitted. The display device 5 and the control device 20 may perform communication in the wireless system.

The input device 9 and the control device 20 are not limited to the wired system. For example, the cable may be omitted. The input device 9 and the control device 20 may perform communication in the wireless system.

The control device 20 can be configured by, for example, a computer (PC) incorporating a CPU (Central Processing Unit), which is an example of a processor. The control device 20 includes a control section 201 that performs control and the like of driving (operation) of a first driving source 401, a second driving source 402, a third driving source 403, a fourth driving source 404, a fifth driving source 405, a sixth driving source 406, and an end effector 19 explained below of the robot 1, a determining section 206, a receiving section 207, a storing section 208 (a memory), and a display control section 209.

The control section 201 includes a force control section 202 that performs force control on the robot 1 and a position control section 203 that performs position control on the robot 1. The control section 201 has a function of performing the force control, the position control, and the like and controlling driving of the robot 1, that is, driving of a robot arm 10, the end effector 19, and the like. The control section 201 (the force control section 202 and the position control section 203) includes, for example, a CPU (a processor), a RAM, and a ROM in which computer programs are stored. The function of the control section 201 (the force control section 202 and the position control section 203) can be realized by, for example, executing various computer programs with the CPU.

The display control section 209 has a function of causing the display device 5 to display various images (including various screens such as a window), characters, and the like. That is, the display control section 209 has a function of controlling driving of the display device 5. The function of the display control section 209 can be realized by, for example, a GPU (a processor) or a CPU (a processor).

The storing section 208 has a function of storing various kinds of information (including data and computer programs). The function of the storing section 208 can be realized by, for example, a semiconductor memory such as a RAM or a ROM, a hard disk device, or an external storage device.

The determining section 206 has a function of performing various kinds of determination. The function of the determining section 206 can be realized by, for example, a CPU (a processor).

The receiving section 207 has a function of receiving an input from the input device 9. The function of the receiving section 207 can be realized by, for example, an interface circuit. Note that, for example, when a touch panel is used, the receiving section 207 has a function of an input detecting section that detects, for example, contact of a finger of a user with the touch panel.

The display device 5 includes a monitor (not shown in FIGS. 1 and 3) configured by, for example, a liquid crystal display or an EL display. The display device 5 displays, for example, various images (including various screens such as a window) and characters.

The input device 9 can be configured by, for example, a mouse and a keyboard. The user can give instructions (inputs) of various kinds of processing and the like to the control device 20 by operating the input device 9.

Specifically, the user can give an instruction to the control device 20 through operation for clicking various screens (a window, etc.) displayed on the display device 5 with the mouse of the input device 9 or operation for inputting characters, numbers, and the like with the keyboard of the input device 9. In the following explanation, the instruction given by the user using the input device 9 (the input by the input device 9) is referred to as "operation instruction" as well. The operation instruction includes selection operation for selecting desired content from contents displayed on the display device 5 with the input device 9, an input instruction for inputting characters, numbers, and the like with the input device 9. The input includes selection.

Note that, in this embodiment, a display input device (no shown in FIGS. 1 and 3) including both of the display device 5 and the input device 9 (the display section and the input section) may be provided instead of the display device 5 and the input device 9. As the display input device, for example, a touch panel (an electrostatic touch panel or a pressure-sensitive touch panel) can be used. The input device 9 may be configured to recognize sound (including voice).

As shown in FIGS. 1 and 2, the robot 1 includes a base 11 and the robot arm 10. The robot arm 10 includes a first arm 12, a second arm 13, a third arm 14, a fourth arm 15, a fifth arm 17, and a sixth arm 18 and a first driving source 401, a second driving source 402, a third driving source 403, a fourth driving source 404, a fifth driving source 405, and a sixth driving source 406. A wrist 16 is configured by the fifth arm 17 and the sixth arm 18. The end effector 19 such as a hand can be detachably attached (connected) to the distal end of the sixth arm 18. An object 81 can be held (gripped) by the end effector 19. The object 81 held by the end effector 19 is not particularly limited. Examples of the object 81 include various objects such as electronic components and electronic devices.

The end effector 19 is not particularly limited if the end effector 19 can hold the object 81. Examples of the end effector 19 include a hand capable of gripping (grasping) the object 81 and a suction head (a suction hand) that sucks the object 81 to hold the object 81. In this embodiment, an example is explained in which the suction head is used as the end effector 19.

"The end effector 19 is attached (connected) to the robot arm 10 (the sixth arm 18)" is not limited to direct attachment of the end effector 19 to the robot arm 10 and includes indirect attachment of the end effector 19 to the robot arm 10 such as attachment of the end effector 19 to a force detecting section 7 in this embodiment.

In this embodiment, the force detecting section 7 (a force detecting device) is detachably attached to the distal end of the sixth arm 18 of the robot arm 10. The end effector 19 is detachably attached (connected) to the force detecting section 7. That is, the force detecting section 7 is provided between the sixth arm 18 and the end effector 19. A movable section 30 is configured by the robot arm 10, the force detecting section 7, and the end effector 19.

Note that the force detecting section 7 is detachably connected to the sixth arm 18. The end effector 19 is detachably connected to the force detecting section 7. However, not only this, but, for example, the force detecting section 7 may be undetachably provided. The end effector 19 may be undetachably provided.

The force detecting section 7 detects a force (including a translational force and a moment) applied to the end effector 19. The force detecting section 7 is not particularly limited. In this embodiment, for example, a six-axis force sensor capable of detecting force components (translational force components) in axial directions of respective three axes orthogonal to one another and force components (rotational force components) around the respective three axes is used. Note that the force detecting section 7 may be a device having a different configuration.

The robot 1 is a single-arm six-axis vertical articulated robot in which the base 11, the first arm 12, the second arm 13, the third arm 14, the fourth arm 15, the fifth arm 17, and the sixth arm 18 are coupled in this order from the proximal end side toward the distal end side. In the following explanation, the first arm 12, the second arm 13, the third arm 14, the fourth arm 15, the fifth arm 17, the sixth arm 18, and the wrist 16 are respectively referred to as "arms" as well. The first driving source 401, the second driving source 402, the third driving source 403, the fourth driving source 404, the fifth driving source 405, and the sixth driving source 406 are respectively referred to as "driving sources" as well. Note that the lengths of the arms 12 to 15, 17, and 18 are not respectively particularly limited and can be set as appropriate.

The base 11 and the first arm 12 are coupled via a joint 171. The first arm 12 is capable of turning, with respect to the base 11, around a first turning axis O1 parallel to the vertical direction. The first turning axis O1 coincides with the normal of the upper surface of a floor 101, which is a setting surface of the base 11. The first turning axis O1 is a turning axis present on the most upstream side in the robot 1. The first arm 12 turns according to driving of the first driving source 401 including a motor (a first motor) 401M and a reduction gear (not shown in FIGS. 1 and 2). The motor 401M is controlled by the control device 20 via a motor driver 301. Note that the reduction gear may be omitted.

The first arm 12 and the second arm 13 are coupled via a joint 172. The second arm 13 is capable of turning, with respect to the first arm 12, around a second turning axis O2 parallel to the horizontal direction. The second turning axis O2 is parallel to an axis orthogonal to the first turning axis O1. The second arm 13 turns according to driving of the second driving source 402 including a motor (a second motor) 402M and a reduction gear (not shown in FIGS. 1 and 2). The motor 402M is controlled by the control device 20 via a motor driver 302. Note that the reduction gear may be omitted. The second turning axis O2 may be orthogonal to the first turning axis O1.

The second arm 13 and the third arm 14 are coupled via a joint 173. The third arm 14 is capable of turning, with respect to the second arm 13, around a third turning axis O3 parallel to the horizontal direction. The third turning axis O3 is parallel to the second turning axis O2. The third arm 14 turns according to driving of the third driving source 403 including a motor (a third motor) 403M and a reduction gear (not shown in the figure). The motor 403M is controlled by the control device 20 via a motor driver 303. Note that the reduction gear may be omitted.

The third arm 14 and the fourth arm 15 are coupled via a joint 174. The fourth arm 15 is capable of turning, with respect to the third arm 14, around a fourth turning axis O4 parallel to the center axis direction of the third arm 14. The fourth turning axis O4 is orthogonal to the third turning axis O3. The fourth arm 15 turns according to driving of the fourth driving source 404 including a motor (a fourth motor) 404M and a reduction gear (not shown in FIGS. 1 and 2). The motor 404M is controlled by the control device 20 via a motor driver 304. Note that the reduction gear may be omitted. The fourth turning axis O4 may be parallel to an axis orthogonal to the third turning axis O3.

The fourth arm 15 and the fifth arm 17 of the wrist 16 are coupled via a joint 175. The fifth arm 17 is capable of turning around a fifth turning axis O5 with respect to the fourth arm 15. The fifth turning axis O5 is orthogonal to the fourth turning axis O4. The fifth arm 17 turns according to driving of the fifth driving source 405 including a motor (a fifth motor) 405M and a reduction gear (not shown in FIGS. 1 and 2). The motor 405M is controlled by the control device 20 via a motor driver 305. Note that the reduction gear may be omitted. The fifth turning axis O5 may be parallel to an axis orthogonal to the fourth turning axis O4.

The fifth arm 17 of the wrist 16 and the sixth arm 18 are coupled via a joint 176. The sixth arm 18 is capable of turning around a sixth turning axis O6 with respect to the fifth arm 17. The sixth turning axis O6 is orthogonal to the fifth turning axis O5. The sixth arm 18 turns according to driving of the sixth driving source 406 including a motor (a sixth motor) 406M and a reduction gear (not shown in FIGS. 1 and 2). The motor 406M is controlled by the control device 20 via a motor driver 306. Note that the reduction gear may be omitted. The sixth turning axis O6 may be parallel to an axis orthogonal to the fifth turning axis O5.

In the driving sources 401 to 406, a first angle sensor 411, a second angle sensor 412, a third angle sensor 413, a fourth angle sensor 414, a fifth angle sensor 415, and a sixth angle sensor 416 are provided in the motors or the reduction gears of the driving sources 401 to 406. In the following explanation, the first angle sensor 411, the second angle sensor 412, the third angle sensor 413, the fourth angle sensor 414, the fifth angle sensor 415, and the sixth angle sensor 416 are respectively referred to as "angle sensors" as well. The angle sensors are not particularly limited. For example, an encoder such as a rotary encoder can be used. Rotation (turning) angles of rotation axes (turning axes) of the motors or the reduction gears of the driving sources 401 to 406 are respectively detected by the angle sensors 411 to 416.

The motors of the driving sources 401 to 406 are not respectively particularly limited. For example, a servomotor such as an AC servomotor or a DC servomotor is desirably used.

The robot 1 is electrically connected to the control device 20. That is, the driving sources 401 to 406 and the angle sensors 411 to 416 are respectively electrically connected to the control device 20.

The control device 20 can operate the arms 12 to 15 and the wrist 16 independently from one another. That is, the control device 20 can control the driving sources 401 to 406 independently from one another via the motor drivers 301 to 306. In this case, the control device 20 performs detection with the angle sensors 411 to 416 and the force detecting section 7 and respectively controls driving of the driving sources 401 to 406, for example, angular velocities and rotation angles on the basis of results of the detection (detection information). A computer program for the control is stored in advance in the storing section 208 of the control device 20.

In this embodiment, the base 11 is a portion located in the bottom in the vertical direction of the robot 1 and fixed to (set in) the floor 101 or the like of a setting space. A method of fixing the base 11 is not particularly limited. For example, in this embodiment, a fixing method by a plurality of bolts 111 is used. The floor 101 of a portion to which the base 11 is fixed is a plane (a surface) parallel to the horizontal plane. However, the floor 101 is not limited to this.

In the base 11, for example, the motor 401M and the motor drivers 301 to 306 are housed. Note that the motor drivers 301 to 306 may be provided in the control device 20.

The arms 12 to 15 respectively include hollow arm bodies 2, driving mechanisms 3 housed in the arm bodies 2 and including motors, and sealing sections 4 configured to seal the insides of the arm bodies 2. Note that, in FIG. 1, the arm body 2, the driving mechanism 3, and the sealing section 4 included in the first arm 12 are respectively represented as "2a", "3a", and "4a" as well. The arm body 2, the driving mechanism 3, and the sealing section 4 included in the second arm 13 are respectively represented as "2b", "3b", and "4b" as well. The arm body 2, the driving mechanism 3, and the sealing section 4 included in the third arm 14 are respectively represented as "2c", "3c", and "4c" as well. The arm body 2, the driving mechanism 3, and the sealing section 4 included in the fourth arm 15 are respectively represented as "2d", "3d", and "4d" as well.

Basics of control in the robot system 100 are explained.

The control device 20 controls driving (operation) of the robot 1 with position control, force control, or the like on the basis of outputs of the angle sensors 411 to 416 and the force detecting section 7, that is, detection results (detected angles) of the angle sensors 411 to 416, a detection result (a detected force) of the force detecting section 7, and the like.

The position control is control of the operation of the robot 1 for moving, on the basis of information concerning the position and the posture of the end effector 19 of the robot 1, the end effector 19 to be set in a target position in a target posture. Instead of the end effector 19, the distal end portion of the robot arm 10, an object (not shown in FIG. 1) gripped by the end effector 19, or the like may be moved. The information concerning the position and the posture of the end effector 19 can be calculated on the basis of the detection results of the angle sensors 411 to 416.

The force control is control of the operation of the robot 1 for, for example, changing the position and the posture of the end effector 19 or pushing, pulling, or rotating the end effector 19 on the basis of the detection result of the force detecting section 7. The force control includes, for example, impedance control and force trigger control.

In the force trigger control, detection is performed by the force detecting section 7. The robot arm 10 is moved (including a change of the posture of the robot arm 10), that is, operated until a predetermined force is detected by the force detecting section 7.

The impedance control includes tracer control. First, the impedance control is briefly explained. In the impedance control, the control device 20 controls the operation of the robot arm 10 (the robot 1) to maintain a force applied to the distal end portion of the robot arm 10 at a predetermined force as much as possible, that is, maintain a force in a predetermined direction detected by the force detecting section 7 at a target value (including 0) as much as possible. Consequently, for example, when the control device 20 performs the impedance control on the robot arm 10, the robot arm 10 performs operation in which an object (not shown in FIG. 1) gripped by the end effector 19 traces another object (not shown in FIG. 1) in the predetermined direction.

The impedance control is explained more in detail. A model of the impedance control of the robot 1 can be represented by, for example, an equation of motion indicated by the following Expression (A).

$$f(t)=mx''+cx'+kx \qquad (A)$$

In the above Expression (A), m represents mass (inertia), c represents a coefficient of viscosity, k represents a coefficient of elasticity (rigidity), f(t) represents a force, and x represents displacement (a position) from a target position.

Primary differential of x, that is, x" corresponds to velocity. Secondary differential of x, that is x" corresponds to acceleration. Note that, in the following explanation, m, c, and k are respectively simply referred to as "parameters" as well.

In the impedance control, a control system for imparting characteristics of the above Expression (A) to the distal end portion of the robot arm 10 is configured. That is, the control device 20 performs control as if the distal end portion of the robot arm 10 has imaginary mass, an imaginary coefficient of viscosity, and an imaginary coefficient of elasticity represented by the above Expression (A).

The parameters m, c, and k in the above Expression (A) are not particularly limited and are set as appropriate on the basis of conditions. That is, the parameters m, c, and k are respectively set to convenient values according to work performed by the robot 1.

The robot system 100 (the robot 1) performs work on predetermined one or a plurality of objects or the like, for example, under the control by the control device 20. In this embodiment, the robot system 100 (the robot 1) performs fitting work for fitting the object 81 in an object to be fit 82.

The fitting work is explained below.

In the fitting work, the robot 1 holds (grips) the object 81 with the end effector 19 and fits the object 81 in the object to be fit 82 (see FIGS. 7 to 9).

The "fitting" is not limited to fitting in a narrow sense and is used in a wider concept including impaction, engagement, and insertion. Therefore, depending on the configurations of the object 81 and the object to be fit 82, the "fitting" can read "impaction", "engagement", "insertion", and the like.

Note that the object 81 and the object to be fit 82 may be interchanged to set the object to be fit 82 as an object and set the object 81 as an object to be fit.

The object 81 and the object to be fit 82 are respectively not particularly limited. In this embodiment, the object 81 and the object to be fit 82 have the following structures.

As shown in FIG. 4, the object 81 includes a main body section 810 formed in a rectangular parallelepiped shape (a tabular shape) in plan view and at least one first engaging section 811 provided in the main body section 810. In this embodiment, a plurality of first engaging sections 811 are provided.

The object to be fit 82 includes a main body section 820 including a recessed section 821 and at least one second engaging section 822 provided in the recessed section 821 of the main body section 820. The recessed section 821 is formed in a shape in which the object 81 can be fit. That is, the shape of the recessed section 821 is slightly small like the object 81. In this embodiment, a plurality of second engaging sections 822 are provided.

The second engaging section 822 engageable with the first engaging section 811 is formed in an engageable structure in the fitting work.

As shown in FIG. 5, the first engaging section 811 is formed in a tabular shape and includes a hole 812.

The second engaging section 822 is configured by an elastic section (an elastic member) formed by curving or bending a leaf spring (an elastic plate). That is, the second engaging section 822 includes a tabular base 823 and an elastic piece 824, one end portion of which is coupled to one end portion of the base 823, the elastic piece 824 being elastically deformed to be capable of approaching and separating from the base 823. The elastic piece 824 includes, halfway thereof, an inserting section 825 insertable into the hole 812 of the first engaging section 811 in the fitting work. The inserting section 825 projects toward the base 823.

In the fitting work, when the object 81 is fit in the object to be fit 82, the first engaging section 811 is inserted into between the base 823 and the elastic piece 824 of the second engaging section 822. In this process, a force detected by the force detecting section 7 gradually increases. The object 81 and the object to be fit 82 are fit. The inserting section 825 of the second engaging section 822 is inserted into the hole 812 of the first engaging section 811 (see FIG. 6). In this process, the force detected by the force detecting section 7 instantaneously decreases. In this way, the first engaging section 811 and the second engaging section 822 are engaged.

Note that the first engaging section 811 of the object 81 and the second engaging section 822 of the object to be fit 82 may be interchanged. The object 81 may include the second engaging section 822. The object to be fit 82 may include the first engaging section 811.

In this embodiment, the second engaging section 822 includes the elastic section. However, not only this, but the first engaging section 811 may include the elastic section. That is, at least one of the first engaging section 811 and the second engaging section 822 only has to include the elastic section. The first engaging section 811 and the second engaging section 822 may be omitted.

The structures of the first engaging section 811 and the second engaging section 822 may be other structures.

Control of the robot 1 by the control device 20 is explained.

In the fitting work performed by the robot 1, the control device 20 controls driving of the robot 1 with one or both of the force control section 202 and the position control section 203 and determines, with the determining section 206, pass/fail of a result of the fitting work, that is, whether the result of the fitting work is "pass" or "fail".

When the result of the fitting work is the "pass", the fitting is properly performed. This is referred to as "fitting is successful (OK)" as well.

When the result of the fitting work is the "fail", the fitting is not properly performed. This is referred to as "fitting is unsuccessful (NG)" as well.

In the fitting work, the force detecting section 7 detects a force applied to the object 81 (the end effector 19), that is, a force in a Z-axis direction (hereinafter simply referred to as "force" as well). The force control section 202 performs, on the robot 1, first force control, in which a target force in the Z-axis direction is a first force, and second force control, in which a target force in the Z-axis direction is a second force larger than the first force, in this order to control driving of the robot 1. Information concerning the force detected by the force detecting section 7 is stored in the storing section 208 in association with time. In an example shown in FIG. 10, the first force is 5 N, the second force is 20 N, and a difference between the second force and the first force is 15 N. As shown in FIG. 1, a Z axis is set to coincide with or in parallel to the sixth turning axis O6.

A change over time of the force in the Z-axis direction detected by the force detecting section 7 in the fitting work is as shown in FIG. 10. Success (OK) of the fitting is indicated by a solid line. Failure (NG) of the fitting is indicated by a broken line.

As shown in FIG. 10, when the fitting is successful, a portion 91 in which the force detected by the force detecting section 7 decreases by a first value "a" or more (in the example shown in FIG. 10, approximately 6 N) is present while the second force control is performed. The portion 91 is a portion between a peak 92 of a waveform (a peak of a ridge) at the time when the force decreases and a peak 93 of the waveform (a peak of a trough) at the time when the force increases thereafter. An amount of the decrease in the force in the portion 91 is a difference between a force at the peak 92 and a force at the peak 93. Note that, as explained above, the portion 91 is generated because, for example, when the object 81 and the object to be fit 82 are fit, the inserting section 825 of the second engaging section 822 is inserted into the hole 812 of the first engaging section 811, whereby the force detected by the force detecting section 7 instantaneously decreases.

When the fitting is successful (when the result of the fitting work is the "pass"), in the example shown in FIG. 10, a minimum of the force detected by the force detecting section 7 in the portion 91, that is, a force at the peak 93 is smaller than the first force.

Note that the graph shown in FIG. 10 is an example. After the portion 91, a portion where the force detected by the force detecting section 7 decreases again is present. However, for example, the portion is absent in some case.

On the other hand, when the fitting is unsuccessful, the force detected by the force detecting section 7 gradually increases while the second force control is performed. That is, the portion 91 is absent.

Such a correlation is present between the successful fitting and the unsuccessful fitting. Therefore, in the fitting work, the determining section 206 determines pass/fail of a result of the fitting work on the basis of whether the portion 91 where the force in the Z-axis direction (a translational force) detected by the force detecting section 7 decreases by the first value "a" or more is present. That is, while the second force control is performed, the determining section 206 determines that the result of the fitting work is the "pass" when the portion 91 is present and determines that the result of the fitting work is the "fail" when the portion 91 is absent. By performing the determination in this way, it is possible to easily and accurately determine the pass/fail of the result of the fitting work. Note that the determining section 206 may determine whether the portion 91 is present not only while the second force control is performed but also while the second force control is not performed, for example, the first force control is performed.

The force control section 202 ends the second force control after the determining section 206 determines the pass/fail of the result of the fitting work and before the force detected by the force detecting section 7 reaches the second force. Consequently, it is possible to reduce a time required for the fitting work. Note that the force control section 202 may not end the second force control before the force detected by the force detecting section 7 reaches the second force.

The first value "a" is not particularly limited and is set as appropriate according to conditions. However, the first value "a" is desirably equal to or larger than a force of ⅕ of the difference between the second force and the first force and equal to or smaller than a force of ⅓ of the difference and more desirably equal to or larger than a force of ¼ of the difference and equal to or smaller than the force of ⅓ of the difference. Consequently, it is possible to prevent a decrease in the force detected by the force detecting section 7 due to the influence of noise from being determined as the "pass". It is possible to more accurately determine the pass/fail of the result of the fitting work.

The first force and the second force are respectively not particularly limited and are set as appropriate according to conditions.

A value used for the determination of the pass/fail of the result of the fitting work is not limited to a lower limit value. A lower limit value and an upper limit value may be specified as the value.

In this case, in the fitting work, the determining section 206 determines the pass/fail of the result of the fitting work on the basis of whether a portion where the force detected by the force detecting section 7 decreases by a value equal to or larger than the first value "a" (a first predetermined value) and equal to or smaller than a predetermined value "b" (a second predetermined value) is present. The predetermined value "b" is a value larger than the first value "a". Consequently, it is possible to more accurately determine the pass/fail of the result of the fitting work.

In the first force control, the determining section 206 determines whether the fitting work is correctly performed on the basis of the position of a predetermined part of the robot 1, for example, the position and the posture of the end effector 19. Specifically, because the position and the posture of the object 81 can be calculated from the position and the posture of the end effector 19, the determining section 206 determines whether a relation between the positions and the postures of the object 81 and the recessed section 821 of the object to be fit 82 is a relation between positions and postures that enables fitting. When the relation is the relation between positions and postures that enables fitting, the determining section 206 determines that the fitting work is correctly performed. When the relation is not the relation between positions and postures that enables fitting, the determining section 206 determines that the fitting work is not correctly performed. Consequently, it is possible to grasp halfway in the fitting work whether the fitting work is correctly performed. It is possible to take measures according to a result of grasping whether the fitting work is correctly performed.

Control by the control device 20 in the fitting work is explained with reference to a flowchart of FIG. 11.

As shown in FIG. 11, in the fitting work, first, the force control section 202 holds the object 81 with the end effector 19 and moves the object 81 to above the recessed section 821 of the object to be fit 82 (step S101).

Subsequently, as shown in FIG. 7, the force control section 202 brings one end portion of the object 81 into contact with one end portion of the recessed section 821 of the object to be fit 82 (step S102).

Subsequently, the force control section 202 performs the first force control for a predetermined time and, as shown in FIG. 8, brings the other end portion (both the end portions) of the object 81 into contact with the other end portion (both the end portions) of the recessed section 821 of the object to be fit 82 (step S103).

Subsequently, the force control section 202 starts the second force control (step S104). That is, the force control section 202 performs the second force control and starts operation for pushing (operation for fitting) the object 81 into the recessed section 821 of the object to be fit 82. The second force control is performed for a predetermined time.

Subsequently, the determining section 206 determines on the basis of force information detected by the force detecting section 7 whether the portion 91 where a force detected by the force detecting section 7 decreases by the first value "a" or more is present (step S105).

When determining in step S105 that the portion 91 where the force detected by the force detecting section 7 decreases by the first value "a" or more is present, the determining section 206 determines that the fitting is successful, that is, a result of the fitting work is the "pass" (step S106).

When determining in step S105 that the portion 91 where the force detected by the force detecting section 7 decreases by the first value "a" or more is absent, the determining section 206 determines that the fitting is unsuccessful, that is, the result of the fitting work is the "fail" (step S107).

Subsequently, the force control section 202 ends the second force control and releases the object 81 held by the end effector 19 (step S108). The control device 20 ends a computer program for this processing.

As explained above, with the control device 20 (the robot system 100), it is possible to easily and accurately determine the pass/fail of the result of the fitting work.

Note that the fitting work is not limited to the work in this embodiment. Examples of the fitting work include work for rotating an object around the Z axis and fitting the object in an object to be fit. In this case, the determining section 206 determines pass/fail of a result of the fitting work on the basis of a rotational force (a moment) detected by the force detecting section 7.

As explained above, the control device 20 includes the force control section 202 that controls the robot 1 with the force control on the basis of a force detected by the force detecting section 7 and the determining section 206 that determines pass/fail of a result of the fitting work in which the robot 1 holds the object 81 and fits the object 81 in the object to be fit 82. In the fitting work, the force control section 202 controls the robot 1 with the force control. In the fitting work, the determining section 206 determines the pass/fail of the result of the fitting work on the basis of whether the portion 91 where the force detected by the force detecting section 7 decreases by the first value "a" or more is present.

With such a control device 20, it is possible to easily and accurately determine the pass/fail of the result of the fitting work.

The force control in the fitting work includes the first force control in which the target force is the first force and the second force control in which the target force is the second force larger than the first force. The determining section 206 determines the pass/fail of the result of the fitting work on the basis of whether the portion 91 is present while the second force control is performed. Consequently, it is possible to reduce a period in which processing for detecting the portion 91 where the force detected by the force detecting section 7 decreases by the first value "a" or more.

When the result of the fitting work is the "pass", a minimum of a force detected by the force detecting section 7 in the portion 91 is desirably smaller than the first force. Consequently, it is possible to more accurately determine the pass/fail of the result of the fitting work.

In the first force control, the determining section 206 determines whether the fitting work is correctly performed on the basis of the position of the predetermined part of the robot 1. Consequently, it is possible to grasp halfway in the fitting work whether the fitting work is correctly performed. It is possible to take measures according to a result of grasping whether the fitting work is correctly performed.

The first value "a" is desirably equal to or larger than a force of 1/10 of the difference between the second force and the first force and equal to or smaller than a force of 1/3 of the difference and more desirably equal to or larger than a force of 1/5 of the difference and equal to or smaller than the force of 1/3 of the difference. Consequently, it is possible to prevent a decrease in the force detected by the force detecting section 7 due to the influence of noise from being determined as the "pass". It is possible to more accurately determine the pass/fail of the result of the fitting work.

The object 81 includes the first engaging section 811. The object to be fit 82 includes the second engaging section 822 engageable with the first engaging section 811 in the fitting work. At least one of the first engaging section 811 and the second engaging section 822 includes a leaf spring (an elastic plate), which is an example of an elastic section. Consequently, in the fitting work, it is possible to smoothly engage the first engaging section 811 and the second engaging section 822. Because the first engaging section 811 and the second engaging section 822 are provided, the portion 91 where the force detected by the force detecting section 7 when the result of the fitting work is the "pass" decreases by the first value "a" or more conspicuously appears. Consequently, it is possible to more accurately determine the pass/fail of the result of the fitting work.

The force control section 202 ends the second force control after the determining section 206 determines the pass/fail of the result of the fitting work and before the force detected by the force detecting section 7 reaches the second force. Consequently, it is possible to reduce a time required for the fitting work.

When the portion 91 is present, the determining section 206 determines that the result of the fitting work is the "pass". Consequently, it is possible to more accurately determine the pass/fail of the result of the fitting work.

The control device 20 includes a processor capable of controlling the robot 1 with force control on the basis of a force detected by the force detecting section 7 and determining pass/fail of a result of the fitting work in which the robot 1 holds the object 81 and fits the object 81 in the object to be fit 82. The control section 201 (the force control section 202) and the determining section 206 correspond to the processor. In the fitting work, the processor controls the robot 1 with the force control and determines the pass/fail of the result of the fitting work on the basis of whether the portion 91 where the force detected by the force detecting section 7 decreases by the first value "a" or more is present.

With such a control device 20, it is possible to easily and accurately determine the pass/fail of the result of the fitting work.

The robot 1 includes the robot arm 10. The robot 1 is controlled by the control device 20.

With such a robot 1, it is possible to easily and accurately determine the pass/fail of the result of the fitting work.

The robot system 100 includes the robot 1 including the robot arm 10 and the control device 20 that controls the robot 1.

With such a robot system 100, it is possible to easily and accurately determine the pass/fail of the result of the fitting work.

Second Embodiment

Figure 12:
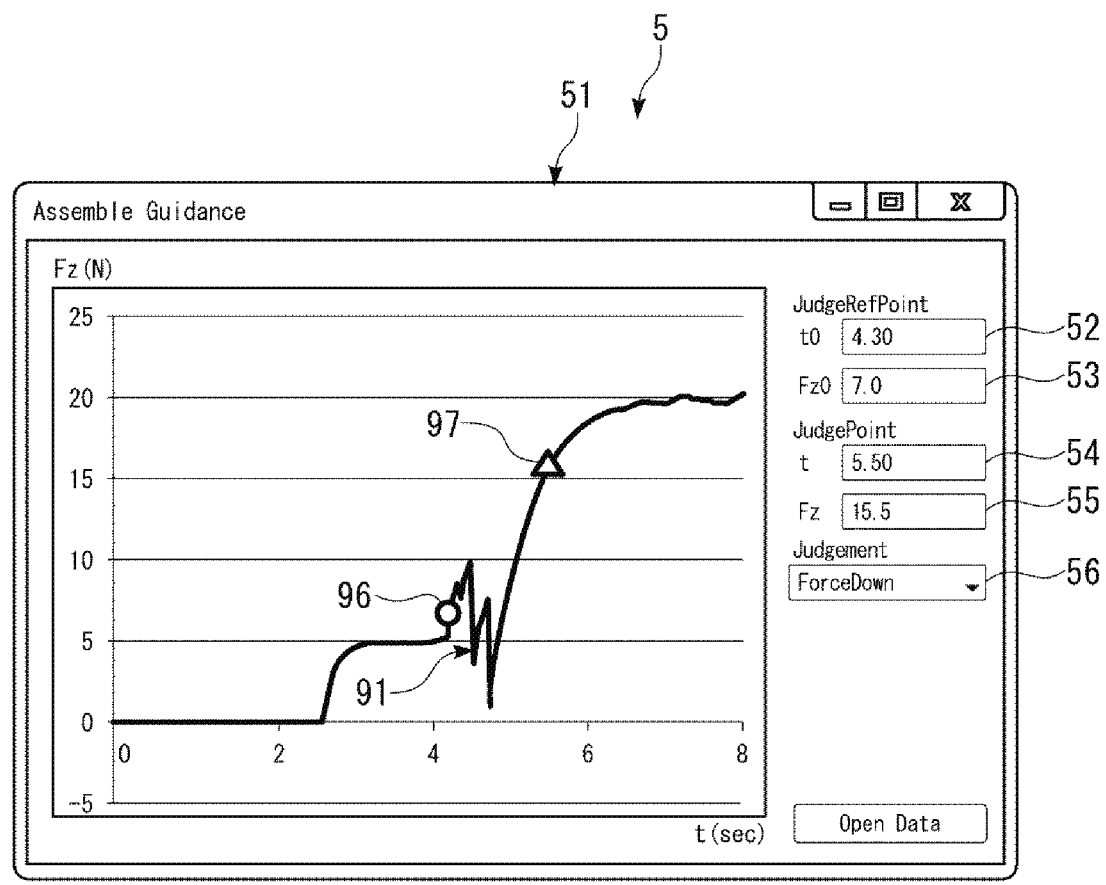
FIG. 12 is a diagram showing a display example displayed on a display device of a robot system according to a second embodiment of the invention.

FIG. 12 is a diagram showing a display example displayed on a display device of a robot system according to a second embodiment of the invention.

The second embodiment is explained below. Differences from the first embodiment are mainly explained. Explanation of similarities is omitted.

The robot system 100 according to the second embodiment is configured to be capable of inputting criteria for determination of pass/fail of a result of fitting work using a window 51 (a screen for criteria input) shown in FIG. 12 displayed on the display device 5 and setting the criteria. The robot system 100 is specifically explained below.

In this embodiment, it is assumed that a plurality of objects 81 are fit in a plurality of objects to be fit 82. It is assumed that a first object 81 is fit in a first object to be fit 82 by the robot 1 and the fitting is successful.

As shown in FIG. 12, the display control section 209 of the control device 20 causes the display device 5 to display the window 51 (a screen for setting).

On the window 51, information concerning a force detected by the force detecting section 7 in fitting work for fitting the first object 81 in the first object to be fit 82, that is, a graph showing a change over time of a force in the Z-axis direction is displayed. Note that the graph shown in FIG. 12 is the same graph as the graph in the case of the success of the fitting shown in FIG. 10 in the first embodiment.

A user performs an operation instruction for inputting reference points 96 and 97 of determination in the window 51 displayed on the display device 5. The input of the reference points 96 and 97 can be performed by click operation in the window 51 using, for example, the mouse of the input device 9.

When the receiving section 207 of the control device 20 receives the operation instruction, the display control section 209 controls driving of the display device 5. The reference points 96 and 97 are displayed on a graph displayed on the display device 5. Time at the reference point 96 is displayed in a text box 52. A force detected by the force detecting section 7 at the reference point 96 is displayed in a text box 53. Time at the reference point 97 is displayed in a text box 54. A force detected by the force detecting section 7 at the reference point 97 is displayed in a text box 55.

The user performs an operation instruction for inputting (selecting) a determination method in a list 56 in the window 51 using the mouse and the keyboard of the input device 9. In FIG. 12, an example is shown in which "Force Down" is input as the determination method.

When the receiving section 207 of the control device 20 receives the operation instruction, the display control section 209 controls driving of the display device 5. "Force Down" is displayed in the list 56 displayed on the display device 5 as the determination method.

The control device 20 (the determining section 206) sets the input reference points 96 and 97 and the determination method respectively as criteria of determination.

When such criteria of determination are set, in the next and subsequent fitting work, the determining section 206 determines pass/fail of a result of the fitting work on the basis of whether the portion 91 is present between the reference point 96 and the reference point 97.

According to the second embodiment explained above, it is possible to exhibit the same effects as the effects in the first embodiment.

In the second embodiment, it is possible to optionally set criteria according to a change of conditions, for example, at the time when the object 81 and the object to be fit 82 are changed.

As explained above, the control device 20 includes the display control section 209 that causes the display device 5 (the display section) to display information concerning the force detected by the force detecting section 7 in the fitting work. Consequently, it is possible to view the information concerning the force displayed on the display device 5 (the display section) and confirm the result of the fitting work.

The control device 20 includes the receiving section 207 configured to receive an input of criteria for the determination of the pass/fail of the result of the fitting work. The determining section 206 determines the pass/fail of the result of the fitting work on the basis of the criteria received by the receiving section 207. Consequently, it is possible to optionally set the criteria according to a change of conditions, for example, at the time when the object 81 and the object to be fit 82 are changed.

Third Embodiment

Figure 13:
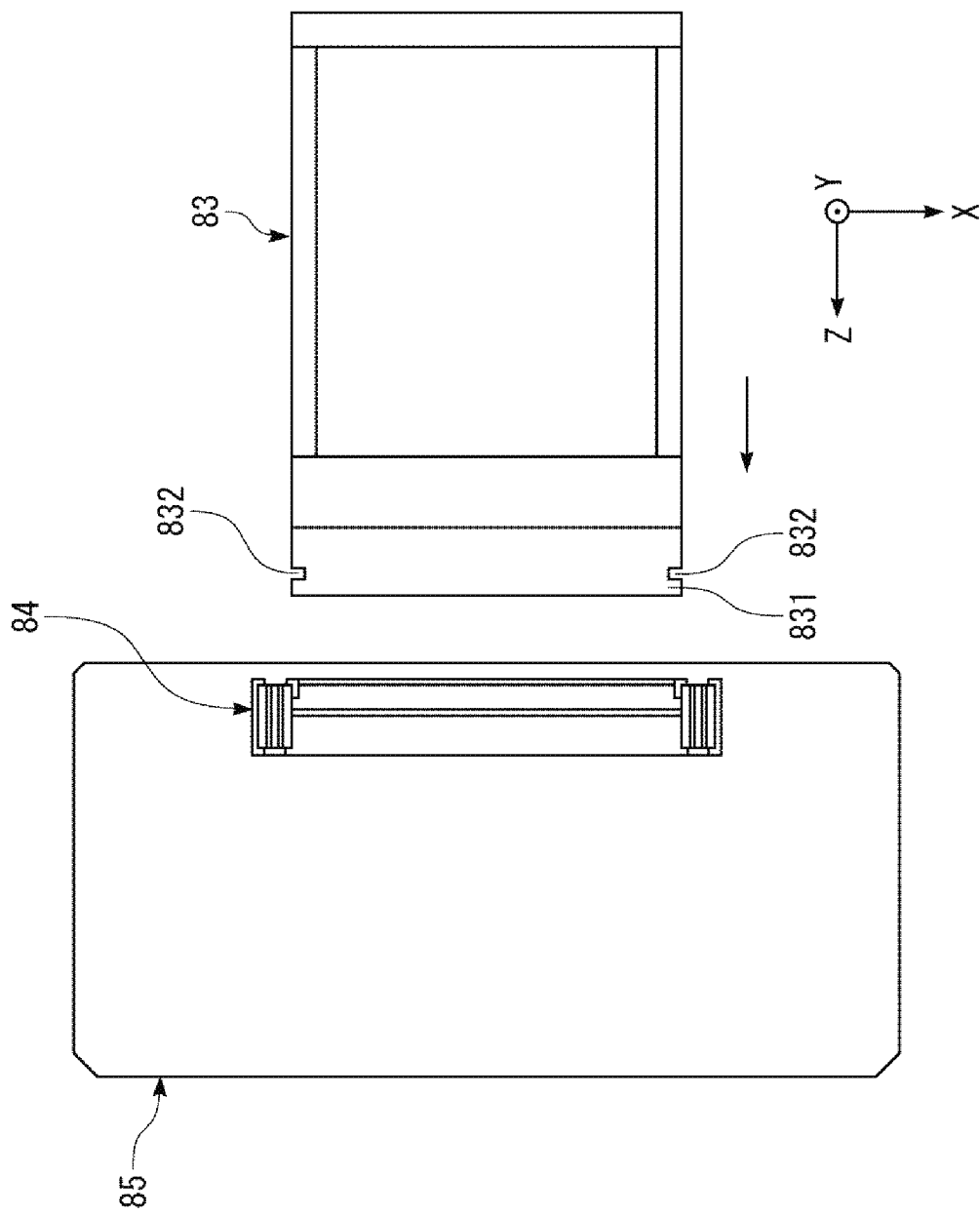
FIG. 13 is a plan view showing an object and an object to be fit used in fitting work in a robot system according to a third embodiment of the invention.
Figure 14:
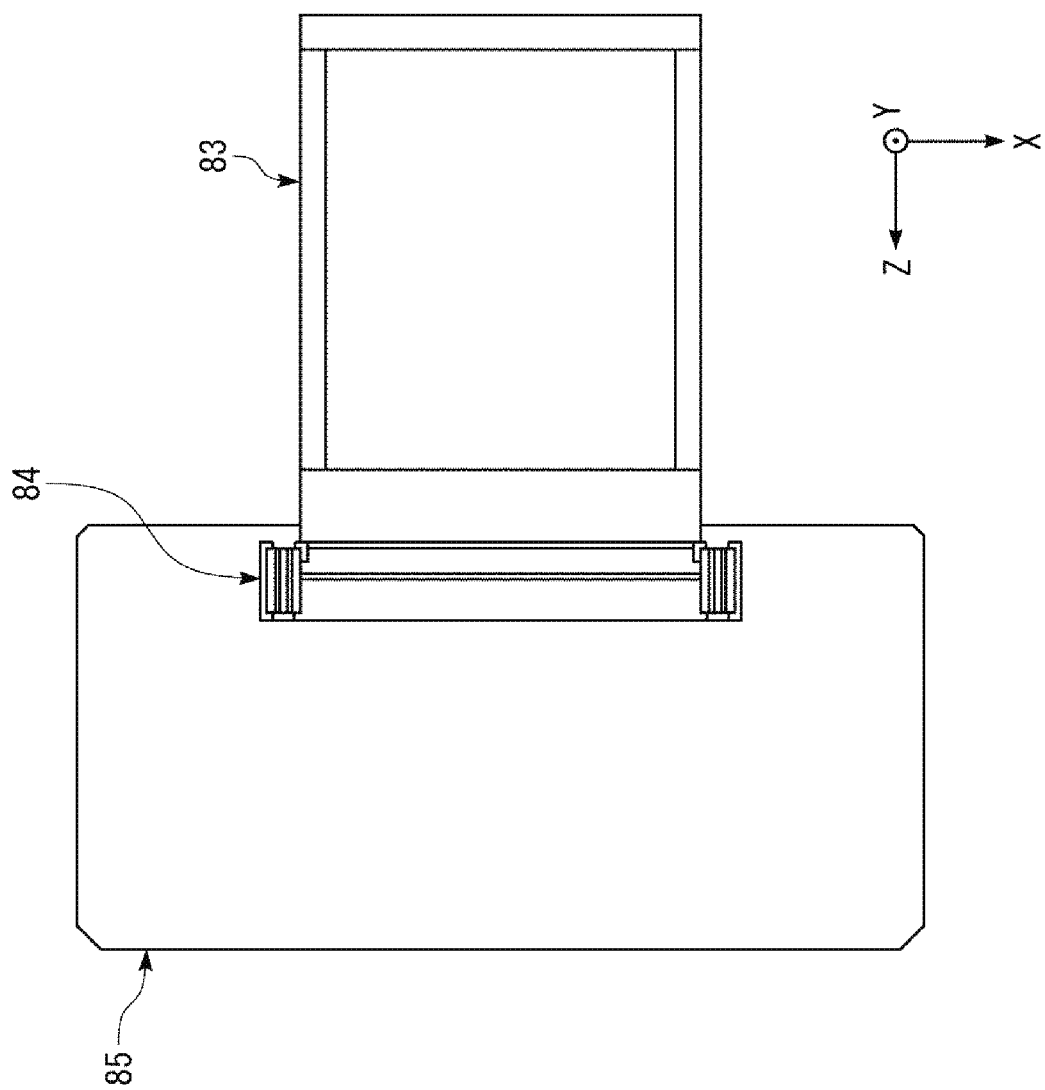
FIG. 14 is a plan view showing the object and the object to be fit used in the fitting work in the robot system according to the third embodiment.
Figure 15:
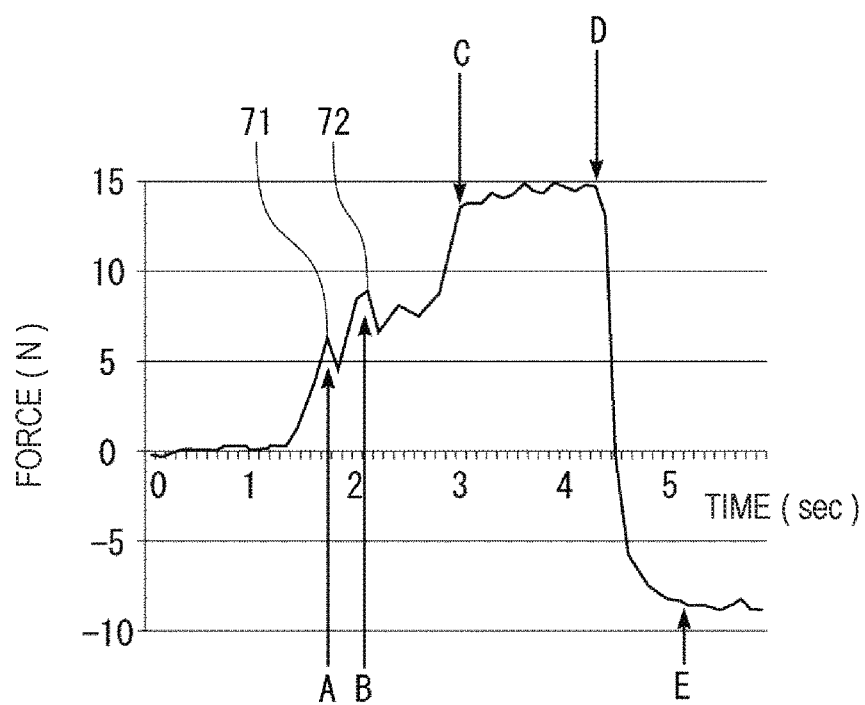
FIG. 15 is a graph showing a change over time of a force detected by a force detecting section in the fitting work in the robot system according to the third embodiment when fitting is successful (a result of the fitting work is "pass").
Figure 16:
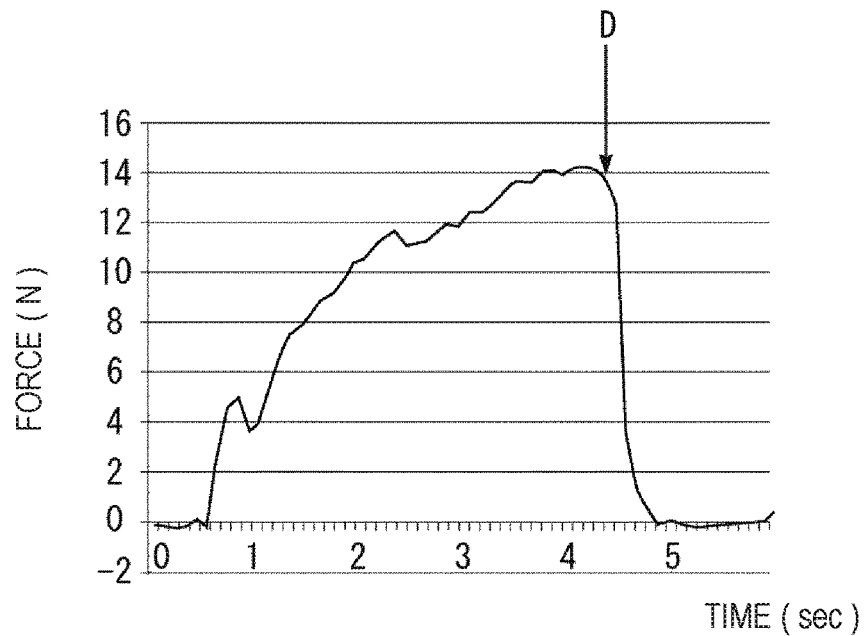
FIG. 16 is a graph showing a change over time of a force detected by the force detecting section in the fitting work in the robot system according to the third embodiment when the fitting is unsuccessful (a result of the fitting work is "fail").

FIGS. 13 and 14 are plan views showing an object and an object to be fit used in fitting work in a robot system according to a third embodiment of the invention. FIG. 15 is a graph showing a change over time of a force detected by a force detecting section in the fitting work in the robot system according to the third embodiment when fitting is successful (a result of the fitting work is the "pass"). FIG. 16 is a graph showing a change over time of a force detected by the force detecting section in the fitting work in the robot system according to the third embodiment when the fitting is unsuccessful (a result of the fitting work is the "fail"). FIGS. 17 to 20 are sectional views (sectional views schematically showing the internal structure of the object to be fit) for explaining the fitting work in the robot system according to the third embodiment.

Note that, for convenience of explanation, as shown in FIG. 13 and the like, a coordinate system configured by an X axis, a Y axis, and a Z axis orthogonal to one another is provided. In the following explanation, for convenience of explanation, an upper side in FIGS. 17 to 20 is referred to as "upper" or "upward" and a lower side in FIGS. 17 to 20 is referred to as "lower" or "downward".

The third embodiment is explained below. Differences from the embodiments explained above are mainly explained. Explanation of similarities is omitted.

In the robot system 100 (see FIGS. 1 and 3) according to the third embodiment, a hand (not shown in FIGS. 1 and 3) is used as the end effector 19.

In the fitting work, the robot 1 grips an object 83 with the end effector 19 and fits the object 83 in an object to be fit 84 under control by the control device 20 (see FIGS. 13 and 14).

The object 83 is an FPC (Flexible Printed Circuit: flexible printed board) or an FFC (Flexible Flat Cable).

As shown in FIG. 13, specifically, the object 83 includes an engaging section 831 (a first engaging section) at the distal end portion thereof. That is, the distal end portion of the object 83 is the engaging section 831 (the first engaging section). Two cutout sections 832 (recessed sections) are formed in the engaging section 831. The cutout sections 832 are disposed at both end portions in the width direction (the X-axis direction) of the object 83.

The object to be fit 84 is a connector such as a connector of a one-action type or a connector of a two-action type. In this embodiment, the connector of the one-action type is explained as an example of the object to be fit 84. Note that the connector of the two-action type includes an openclosable lid and the connector of the one-action type does not include an open-closable lid.

Figure 17:
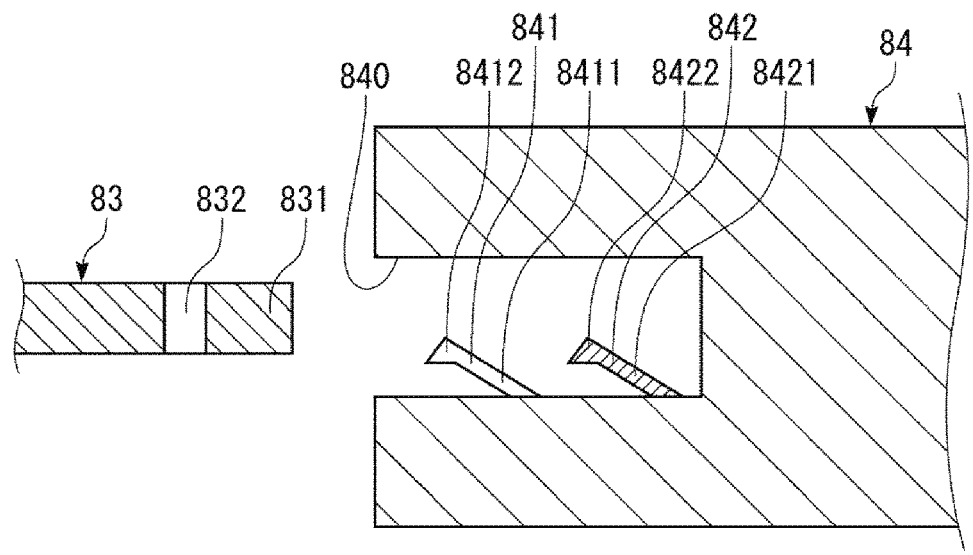
FIG. 17 is a sectional view (a sectional view schematically showing the internal structure of the object to be fit) for explaining the fitting work in the robot system according to the third embodiment.

As shown in FIG. 13, specifically, the object to be fit 84 is provided on a substrate 85. As shown in FIG. 17, the object to be fit 84 includes a recessed section 840 into which the object 83 can be inserted. The object to be fit 84 includes, on the inside of the recessed section 840, two elastic sections 841 having elasticity and two elastic sections 842 having elasticity. The elastic sections 841 respectively include elastic pieces 8411 and heads 8412 provided at the distal end portions of the elastic pieces 8411. The elastic sections 842 respectively include elastic pieces 8421 and heads 8422, which are second engaging sections, provided at the distal end portions of the elastic pieces 8421.

The elastic sections 841 and the elastic sections 842 are disposed in this order from an inlet side toward an inner part of the recessed section 840. The elastic sections 841 are disposed on both end portions in the width direction (the X-axis direction) of the object to be fit 84. In this case, the elastic sections 841 are disposed in positions where the elastic sections 841 do not interfere with the cutout sections 832 of the object 83 (positions further on the center side in the width direction of the object 83 than the cutout sections 832) when the object 83 is inserted into the recessed section 840 of the object to be fit 84. The elastic sections 842 are disposed at both end portions in the width direction of the object to be fit 84. In this case, the elastic sections 842 are disposed in positions where the elastic sections 842 interfere with the cutout sections 832 of the object 83 when the object 83 is inserted into the recessed section 840 of the object to be fit 84.

In the fitting work, the robot 1 grips the object 83 with the end effector 19 and inserts the object 83 into the recessed section 840 of the object to be fit 84. In the following explanation, operation performed when the result of the fitting work is the "pass" is explained together with movements and the like of the cutout sections 832, the elastic sections 841, and the elastic sections 842. Concerning sections provided as a pair, one of the sections is representatively explained.

Figure 18:
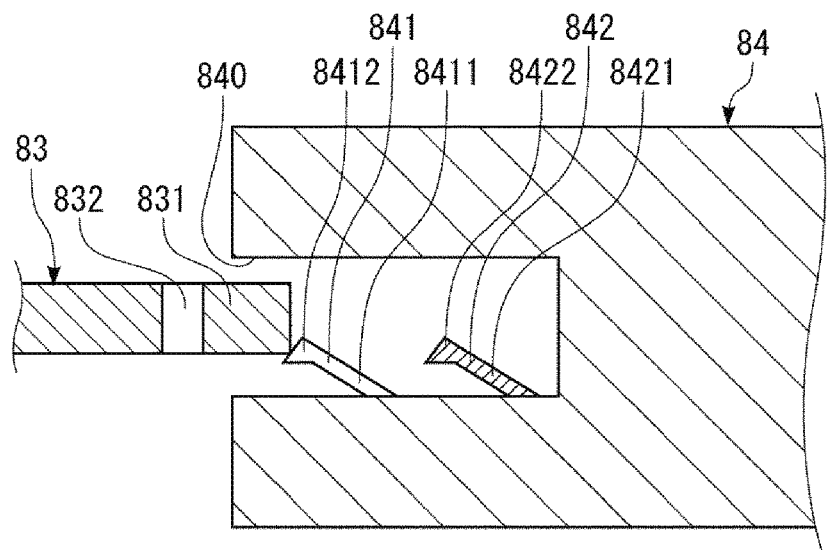
FIG. 18 is a sectional view (a sectional view schematically showing the internal structure of the object to be fit) for explaining the fitting work in the robot system according to the third embodiment.

When the object 83 advances to the inner side in the recessed section 840, first, as shown in FIG. 18, the engaging section 831 of the object 83 interferes with the elastic section 841 of the object to be fit 84. The object 83 is urged by the elastic section 841. In this process, a force in the Z-axis direction (hereinafter simply referred to as "force" as well) detected by the force detecting section 7 increases. After a peak 71 is detected, the force decreases once (see "A" in FIG. 15).

Figure 19:
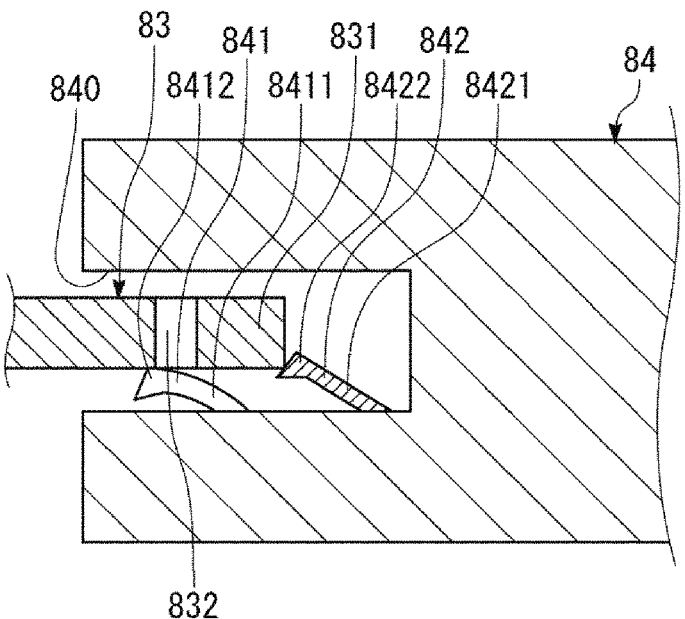
FIG. 19 is a sectional view (a sectional view schematically showing the internal structure of the object to be fit) for explaining the fitting work in the robot system according to the third embodiment.

Subsequently, as shown in FIG. 19, the engaging section 831 of the object 83 interferes with the elastic section 842 of the object to be fit 84. The object 83 is urged by the elastic section 841. The head 8422 of the elastic section 842 is inserted into the cutout section 832 of the engaging section 831 (see FIG. 20). In this process, the force detected by the force detecting section 7 increases. After a peak 72 is detected, the head 8422 of the elastic section 842 is inserted into the cutout section 832, whereby the force instantaneously decreases (see "B" in FIG. 15).

Figure 20:
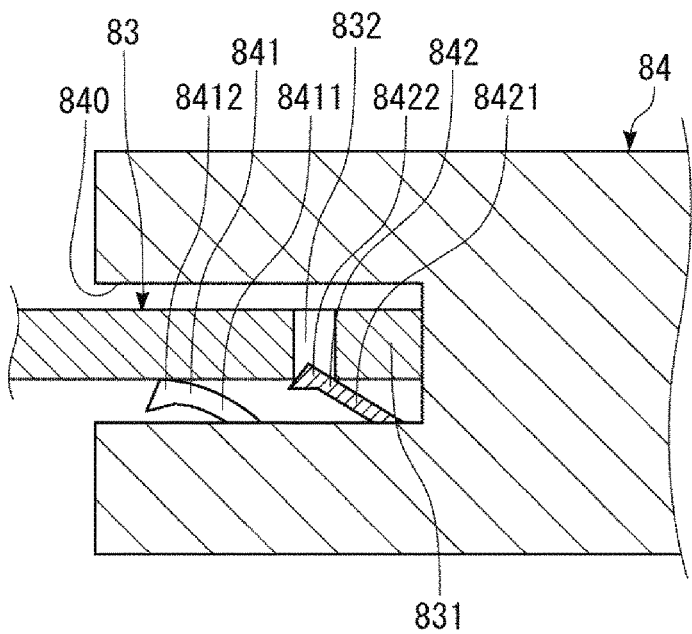
FIG. 20 is a sectional view (a sectional view schematically showing the internal structure of the object to be fit) for explaining the fitting work in the robot system according to the third embodiment.

Subsequently, as shown in FIG. 20, the distal end of the engaging section 831 of the object 83 comes into contact with an end portion in the recessed section 840 of the object to be fit 84. In this process, the force detected by the force detecting section 7 suddenly increases and converges to a predetermined value (in an example shown in FIG. 15, 15 N) (see "C" in FIG. 15). In this way, the engaging section 831 and the head 8422 of the elastic section 842 engage. That is, the object 83 fits in the object to be fit 84.

In such fitting work, the force detecting section 7 detects a force applied to the object 83 (the end effector 19), that is, a force in the Z-axis direction. The force control section 202 performs force control in the Z-axis direction on the robot 1 and controls driving of the robot 1. Information concerning the force detected by the force detecting section 7 is stored in the storing section 208 in association with time. In the example shown in FIG. 15, a target force in the Z-axis direction is 15 N. In this embodiment, as shown in FIG. 13, the direction of the Z axis is the same as a moving direction of the object 83 (an insertion direction into the recessed section 840) at the time when the object 83 is fit in the object to be fit 84. Note that force control in the X-axis direction and force control in the Y-axis direction may be respectively performed or may be omitted.

In the fitting work, the determining section 206 of the control device 20 determines pass/fail of a result of the fitting work as in the first embodiment.

When the fitting is successful, as indicated by "C" in FIG. 15, a portion where a change ratio of the force detected by the force detecting section 7 is high (a portion where the force detected by the force detecting section 7 suddenly increases) is present.

On the other hand, when the fitting is unsuccessful, as shown in FIG. 16, the portion where the range ratio of the force is high explained above is absent.

Therefore, in the fitting work, as indicated by "C" in FIG. 15, it is also possible to determine the pass/fail of the result of the fitting work according to whether the portion where the change ratio of the force detected by the force detecting section 7 is high is present. That is, the determining section 206 determines whether the portion where the change ratio of the force detected by the force detecting section 7 is high is present. When the portion is present, the determining section 206 determines that the result of the fitting work is the "pass". When the portion is absent, the determining section 206 determines that the result of the fitting work is the "fail".

After the fitting work, a tensile test is performed to determine the pass/fail of the result of the fitting work. In the tensile test, the object 83 is moved (pulled) in the opposite direction of a direction in which the object 83 is fit in the object to be fit 84. Note that, in the example shown in FIGS. 15 and 16, the tensile test is started at "D".

In the tensile test, the force detecting section 7 detects a force applied to the object 83 (the end effector 19), that is, a force in the Z-axis direction. The force control section 202 performs force control in the Z-axis direction on the robot 1 to control driving of the robot 1. Information concerning the force detected by the force detecting section 7 is stored in the storing section 208 in association with time. In the example shown in FIG. 15, the target force in the Z-axis direction is 10 N (when a direction is taken into account, "−10 N"). Note that force control in the X-axis direction and the force control in the Y-axis direction may be respectively performed or may be omitted.

When the fitting is successful, the engaging section 831 of the object 83 and the head 8422 of the elastic section 842 of the object to be fit 84 are engaged. Therefore, as indicated by "E" in FIG. 15, in the tensile test, a force equal to or larger than a second value "c", the absolute value of which is larger than 0, is detected by the force detecting section 7.

On the other hand, when the fitting is unsuccessful, the engaging section 831 of the object 83 and the head 8422 of the elastic section 842 of the object to be fit 84 are not engaged. Therefore, as shown in FIG. 16, in the tensile test, the force equal to or larger than the second value "c" is not detected by the force detecting section 7. That is, the force detected by the force detecting section 7 is 0.

The determining section 206 determines whether the force detected by the force detecting section 7 in the tensile test is equal to or larger than the second value "c". When the force equal to or larger than the second value "c" is detected by the force detecting section 7 in the tensile test, the determining section 206 determines that the result of the fitting work is the "pass". When the force equal to or larger than the second value "c" is not detected, the determining section 206 determines that the result of the fitting work is the "fail". By performing the determination in this way, it is possible to more accurately determine the pass/fail of the result of the fitting work.

The second value "c" is not particularly limited if the second value "c" is a force, the absolute value of which is larger than 0. The second value "c" is set as appropriate according to conditions. However, the second value "c" desirably has the absolute value larger than 0 and is equal to or smaller than a target force (a third force) in the Z-axis direction in the tensile test and is more desirably equal to or larger than a force of ⅕ of the target force and equal to or smaller than the target force (e.g., a force at the peak 72). Consequently, it is possible to more accurately determine the pass/fail of the result of the fitting work.

The target force in the Z-axis direction in the tensile test is not particularly limited and is set as appropriate according to conditions. The target force may be smaller than the force at the peak 72, may be the same as the force at the peak 72, or may be larger than the force at the peak 72. However, the target force is desirably larger than the force at the peak 72, more desirably larger than the force at the peak 72 and equal to or smaller than a triple of the force at the peak 72, and still more desirably larger than the force at the peak 72 and equal to or smaller than a double of the force at the peak 72. Consequently, it is possible to more accurately determine the pass/fail of the result of the fitting work. Note that, when the target value exceeds the upper limit value, depending on other conditions, the object 83 sometimes comes off the object to be fit 84.

Note that, when the object to be fit 84 is a connector of a two-action type (not shown in FIGS. 13 and 14), the robot 1 performs the fitting work, for example, as explained below under the control by the control device 20.

The connector of the two-action type includes an openclosable lid. First, the robot 1 grips a lid of the object to be fit 84 with the end effector 19 and opens the lid.

Subsequently, the robot 1 grips the object 83 with the end effector 19 and inserts and fits the object 83 into the object to be fit 84. In the fitting work, the robot 1 performs tracer control (impedance control) in respective directions of the width direction (the X-axis direction) of the object 83 and a direction around an axis extending in the thickness direction of the object 83 (a direction around the Y axis).

Subsequently, the robot 1 grips the lid of the object to be fit 84 with the end effector 19 and closes the lid.

According to the third embodiment explained above, it is possible to exhibit the same effects as the effects in the embodiments explained above.

As explained above, after the fitting work, the force control section 202 controls the robot 1 with the force control and moves the object 83 in the opposite direction of the direction in the fitting. When a force equal to or larger than the second value "c" larger than 0 is detected by the force detecting section 7, the determining section 206 determines that the result of the fitting work is the "pass". Consequently, it is possible to more accurately determine the pass/fail of the result of the fitting work.

Figure 21:
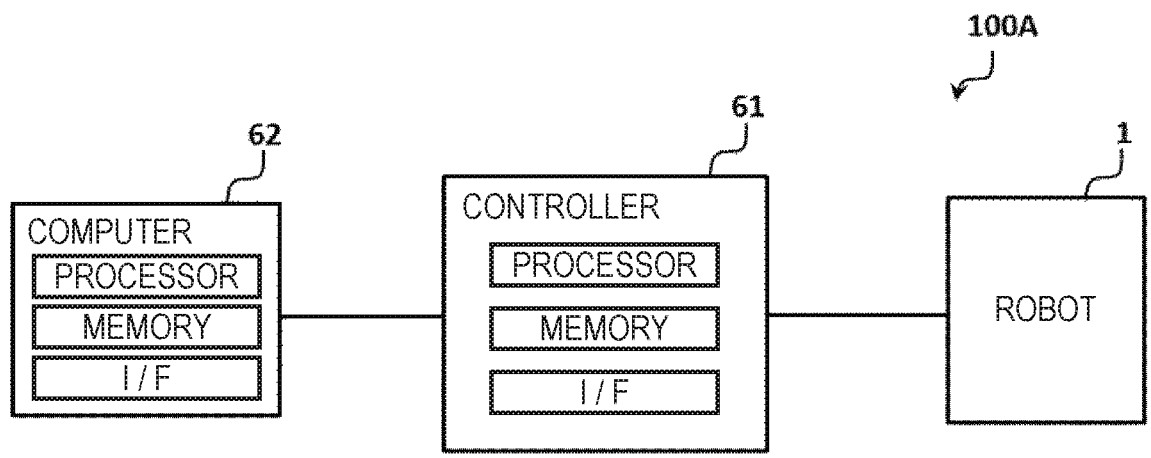
FIG. 21 is a block diagram for explaining the first embodiment, the second embodiment, and the third embodiment centering on hardware (a processor).

FIG. 21 is a block diagram for explaining the first embodiment, the second embodiment, and the third embodiment centering on hardware (a processor).

In FIG. 21, the entire configuration of a robot system 100A in which the robot 1, a controller 61, and a computer 62 are connected is shown. Control of the robot 1 may be executed by a processor present in the controller 61 reading out a command stored in a memory or may be executed via the controller 61 by a processor present in the computer 62 reading out a command stored in a memory.

Therefore, one or both of the controller 61 and the computer 62 can be grasped as a "control device".

Modification 1

Figure 22:
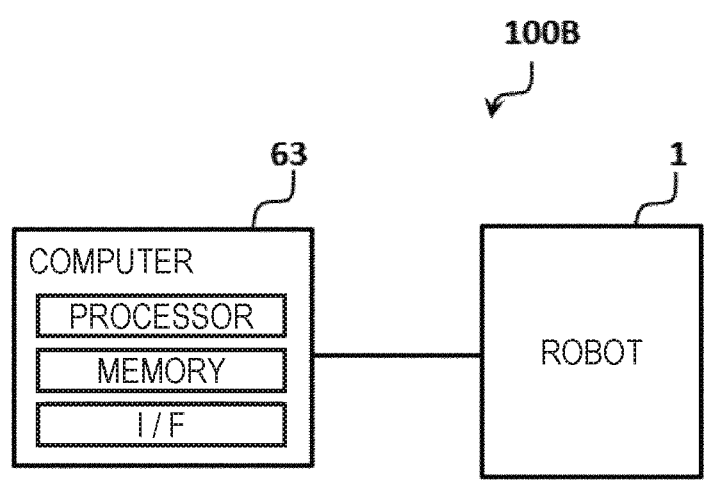
FIG. 22 is a block diagram showing a robot system according to another example 1 (a modification 1) of the invention.

FIG. 22 is a block diagram showing a robot system according to another example 1 (a modification 1) of the invention.

In FIG. 22, the entire configuration of a robot system 100B in which a computer 63 is directly connected to the robot 1 is shown. Control of the robot 1 is directly executed by a processor present in the computer 63 reading out a command stored in a memory. Therefore, the computer 63 can be grasped as a "control device".

Modification 2

Figure 23:
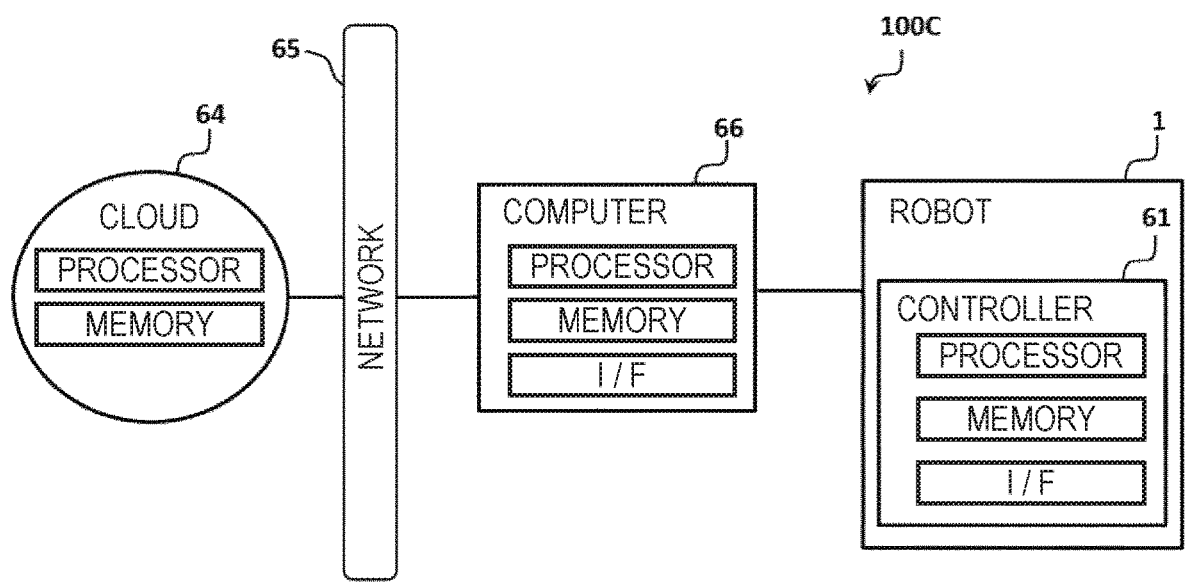
FIG. 23 is a block diagram showing a robot system according to another example 2 (a modification 2) of the invention.

FIG. 23 is a block diagram showing a robot system according to another example 2 (a modification 2) of the invention.

In FIG. 23, the entire configuration of a robot system 100C in which the robot 1 incorporating the controller 61 and a computer 66 are connected and the computer 66 is connected to a cloud 64 via a network 65 such as a LAN is shown. Control of the robot 1 may be executed by a processor present in the computer 66 reading out a command stored in a memory or may be executed via the computer 66 by a processor present on the cloud 64 reading out a command stored in a memory.

Therefore, any one, any two, or three (all) of the controller 61, the computer 66, and the cloud 64 can be grasped as a "control device".

The control device, the robot, and the robot system according to the invention are explained above with reference to the embodiments illustrated in the drawings. However, the invention is not limited to the embodiments. The components of the sections can be replaced with any components having the same functions. Any other components may be added.

The invention may be an invention obtained by combining any two or more configurations (characteristics) in the embodiments.

In the embodiments, the storing section is the component of the control device. However, in the invention, the storing section may be not the component of the control device and may be provided separately from the control device.

In the embodiments, the fixing part of the base of the robot is, for example, the floor in the setting space. However, in the invention, the fixing part is not limited to this. Besides, examples of the fixing part include a ceiling, a wall, a workbench, and a ground. The base itself may be movable.

In the invention, the robot may be set in a cell. In this case, examples of the fixing part of the base of the robot include a floor section, a ceiling section, a wall section, and a workbench in the cell.

In the embodiments, the first surface, which is the plane (the surface) to which the robot (the base) is fixed, is the plane (the surface) parallel to the horizontal plane. However, in the invention, the first surface is not limited to this. For example, the first surface may be a plane (a surface) inclined with respect to the horizontal plane or the vertical plane or may be a plane (a surface) parallel to the vertical plane. That is, the first turning axis may be inclined with respect to the vertical direction or the horizontal direction, may be parallel to the horizontal direction, or may be parallel to the vertical direction.

In the embodiments, the number of turning axes of the robot arm is six. However, in the invention, the number of turning axes of the robot arm is not limited to this. The number of turning axes of the robot arm may be, for example, two, three, four, five, or seven or more. That is, in the embodiments, the number of arms (links) is six. However, in the invention, the number of arms (links) is not limited to this. The number of arms (links) may be, for example, two, three, four, five, or seven or more. In this case, for example, in the robots in the embodiments, by adding an arm between the second arm and the third arm, it is possible to realize a robot including seven arms.

In the embodiments, the number of robot arms is one. However, in the invention, the number of robot arms is not limited to this. The number of robot arms may be, for example, two or more. That is, the robot (a robot body) may be, for example, a plural-arm robot such as a double-arm robot.

In the invention, the robot may be robots of other forms. Specific examples of the robot include a legged walking (running) robot including legs and a horizontal articulated robot such as a SCARA robot.

The processor may be configured by one device or may be configured by a plurality of devices. That is, the processor may be divided into a plurality of unit processors.

Specifically, the processor may be configured by, for example, a first processor capable of controlling the robot with force control on the basis of a force detected by the force detecting section and a second processor capable of determining pass/fail of a result of fitting work in which the robot holds an object and fits the object in an object to be fit. The processor may further include a third processor.

The entire disclosures of Japanese Patent Application Nos. 2017-156009, filed Aug. 10, 2017 and 2017-226103, filed Nov. 24, 2017 are expressly incorporated by reference herein.

What is claimed is:

1. A control device comprising:
a memory configured to store computer-executable instructions; and
a processor configured to execute the computer-executable instructions so as to:
move an end effector of a robot to a first position at which a fitting object held by the end effector contacting a fitted object;
move the end effector with a first force value for a first period of time;
stop the movement of the end effector with the first force value at a second position when the processor determines that the fitting object fits the fitted object;
move the end effector with a second force value for a second period of time from the second position, the second force value being larger than the first force value;
determine whether a detection force value corresponding to an output signal from a force sensor increases to a third force value and whether a force value drop by a first value occurs during the second period of time based on the output signal from the force sensor;
continue the movement of the end effector with the third force value until the second period of time passes when the processor determines that the force value drop by the first value occurs in response to the output signal from the force sensor; and
stop the movement of the end effector with the third force value when the processor determines that no force value drop by the first value occurs in response to the output signal from the force sensor and determines that the detection force value keeps increasing,
wherein the first value is in a range of 1/3 to 1/5 of a difference between the first force value and the third force value.

2. The control device according to claim 1,
wherein, when the processor determines that the force value drop by the first value occurs, the output signal from the force sensor corresponds to a second value, and
the second value is smaller than the first force value.

3. The control device according to claim 1,
wherein the fitting object includes a first engaging section,
the fitted object includes a second engaging section engageable with the first engaging section when the fitting object fits the fitted object, and
at least one of the first engaging section and the second engaging section includes an elastic member.

4. The control device according to claim 1,
wherein the processor is configured to cause a display to display information concerning a value corresponding to the output signal from the force sensor.

5. The control device according to claim 1, further comprising:
an input interface configured to receive information,
wherein the processor is configured to move the end effector, continue the movement of the end effector, and stop the movement of the end effector based on the received information via the input interface.

6. The control device according to claim 1,
wherein the processor is configured to stop the continuation of the movement of the end effector before the dropped force value by the first value reaches the second force value.

7. The control device according to claim 1,
wherein the processor is configured to move the end effector with the second force value from the second position toward a third position, and the processor is configured to move the end effector in a direction from the third position toward the second position after the processor determines that the force value drop by the first value occurs, and
the processor is configured to determine that the fitting object completely fits the fitted object when a value corresponding to the output signal from the force sensor is equal to or larger than a third value that is larger than 0 during the movement of the end effector in the direction from the third position toward the second position.

8. A robot comprising a robot arm, wherein
the robot is controlled by the control device according to claim 1.

9. A robot system comprising:
a robot including a robot arm and an end effector;
a memory configured to store computer-executable instructions; and
a processor configured to execute the computer-executable instructions so as to:
move the end effector of the robot to a first position at which a fitting object held by the end effector contacting a fitted object;
move the end effector with a first force value for a first period of time;
stop the movement of the end effector with the first force value at a second position when the processor determines that the fitting object fits the fitted object;

move the end effector with a second force value for a second period of time from the second position, the second force value being larger than the first force value;

determine whether a detection force value corresponding to an output signal from a force sensor increases to a third force value and whether a force value drop by a first value occurs during the second period of time based on the output signal from the force sensor;

continue the movement of the end effector with the third force value until the second period of time passes when the processor determines that the force value drop by the first value occurs in response to the output signal from the force sensor; and stop the movement of the end effector with the third force value when the processor determines that no force value drop by the first value occurs in response to the output signal from the force sensor and determines that the detection force value keeps increasing, wherein the first value is in a range of 1/3 to 1/5 of a difference between the first force value and the third force value.

10. The robot system according to claim 9, wherein, when the processor determines that the force value drop by the first value occurs, the output signal from the force sensor corresponds to a second value, and the second value is smaller than the first force.

11. The robot system according to claim 9, wherein the fitting object includes a first engaging section, the fitted object includes a second engaging section engageable with the first engaging section when the fitting object fits the fitted object, and at least one of the first engaging section and the second engaging section includes an elastic member.

12. The robot system according to claim 9, wherein the processor is configured to cause a display to display information concerning a value corresponding to the output signal from the force sensor.

13. The robot system according to claim 9, further comprising:

an input interface configured to receive information, wherein the processor is configured to move the end effector, continue the movement of the end effector, and stop the movement of the end effector based on the received information via the input interface.

14. The robot system according to claim 9, wherein the processor is configured to move the end effector with the second force value from the second position toward a third position, and the processor is configured to move the end effector in a direction from the third position toward the second position after the processor determines that the force value drop by the first value occurs, and the processor is configured to determine that the fitting object completely fits the fitted object when a value corresponding to the output signal from the force sensor is equal to or larger than a third value that is larger than 0 during the movement of the end effector in the direction from the third position toward the second position.

* * * * *